US011539488B2

(12) United States Patent
Hosseini et al.

(10) Patent No.: US 11,539,488 B2
(45) Date of Patent: Dec. 27, 2022

(54) CONTROL ELEMENT RESOURCE MAPPING SCHEMES IN WIRELESS SYSTEMS

(71) Applicant: QUALCOMM Incorporated, San Diego, CA (US)

(72) Inventors: Seyedkianoush Hosseini, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 16/258,474

(22) Filed: Jan. 25, 2019

(65) Prior Publication Data
US 2019/0238296 A1    Aug. 1, 2019

Related U.S. Application Data

(60) Provisional application No. 62/622,786, filed on Jan. 26, 2018.

(51) Int. Cl.
*H04L 5/00* (2006.01)
*H04W 76/27* (2018.01)
(Continued)

(52) U.S. Cl.
CPC ....... *H04L 5/0053* (2013.01); *H04W 72/0446* (2013.01); *H04W 72/1205* (2013.01); *H04W 72/1289* (2013.01); *H04W 76/27* (2018.02)

(58) Field of Classification Search
None
See application file for complete search history.

(56) References Cited

U.S. PATENT DOCUMENTS

| 2015/0036615 A1 | 2/2015 | Shimezawa et al. |
| 2015/0304993 A1 | 10/2015 | Shimezawa et al. |

(Continued)

FOREIGN PATENT DOCUMENTS

| CA | 2857489 A1 | 9/2013 |
| CN | 104025495 A | 9/2014 |

(Continued)

OTHER PUBLICATIONS

Ericsson: "Introduction of Shortened Processing Time and Shortened TTI into 36.211, s06-08", 3GPP Draft; 36211_CR0399R2_ (REL-15)_R1-1721326, , 3rd Generation Partnership Project (3GPP), Mobile Competence Centre, 650, Route Des Lucioles ; F-06921 Sophia-Antipolis Cedex, France, vol. RAN WG1, No. Reno, USA; Nov. 27, 2017-Dec. 1, 2017, Dec. 17, 2017 (Dec. 17, 2017), pp. 1-80, XP051364615, Retrieved from the Internet: URL: http://www.3gpp.org/ftp/Meetings_3GPP_SYNC/RAN/Docs/ [retrieved on Dec. 17, 2017].

(Continued)

*Primary Examiner* — Hong Shao
(74) *Attorney, Agent, or Firm* — Holland & Hart LLP

(57) ABSTRACT

Methods, systems, and devices for wireless communications are described. A base station may transmit control information to a UE in a shortened physical downlink control channel (sPDCCH). The sPDCCH may be included in shortened resource element groups (sREGs) of shortened channel control elements (sCCEs), which may be indexed in resource block (RB) sets by using localized or distributed mapping schemes. Updated sREG mapping schemes may result in a uniform distribution of sREGs within available symbols (and, as a result, a uniform distribution of unused resource blocks within the available symbols) and may ensure that sREGs within an sCCE are indexed into only one symbol.

30 Claims, 16 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2016/0234815 A1 | 8/2016 | Chen et al. | |
| 2019/0141679 A1* | 5/2019 | He | H04L 5/0007 |
| 2019/0158170 A1* | 5/2019 | Seo | H04J 11/00 |
| 2019/0229879 A1* | 7/2019 | Yi | H04W 76/11 |
| 2019/0268208 A1* | 8/2019 | Seo | H04L 27/26 |
| 2020/0036497 A1* | 1/2020 | Xu | H04L 5/0053 |

FOREIGN PATENT DOCUMENTS

| | | |
|---|---|---|
| CN | 104115513 A | 10/2014 |
| WO | WO-2012151164 A2 | 11/2012 |
| WO | WO-2013136831 A1 | 9/2013 |

OTHER PUBLICATIONS

Interdigital Inc: "On REG Bundling for PDCCH", 3GPP Draft; R1-1708346 On REG Bundling for PDCCH, 3rd Generation Partnership Project (3GPP), Mobile Competence Centre, 650, Route Des Lucioles ; F-06921 Sophia-Antipolis Cedex, France, vol. RAN WG1, Hangzhou, China; May 15, 2017-May 19, 2017, May 14, 2017(May 14, 2017), pp. 1-3, XP051273539, Retrieved from the Internet: URL: http://www.3gpp.org/ftp/Meetings_3GPP_SYNC/RAN/Docs/[retrieved on May 14, 2017].

International Search Report and Written Opinion—PCT/US2019/015315—ISA/EPO—dated May 6, 2019.

KT Corp: "Considerations on NR PDCCH Structure", 3GPP Draft; R1-1709145, 3rd Generation Partnership Project (3GPP), Mobile Competence Centre, 650, Route Des Lucioles ; F-06921 Sophia-Antipolis Cedex, France, vol. RAN WG1, Hangzhou; May 15, 2017-May 19, 2017, May 14, 2017 (May 14, 2017), 3 Pages, XP051274300, Retrieved from the Internet: URL: http://www.3gpp.org/ftp/Meetings_3GPP_SYNC/RAN/Docs/[retrieved on May 14, 2017], p. 2, Paragraph 2.

Sharp: "REG Bundling Per CCE for NR PDCCH", 3GPP Draft; R1-1708370, 3rd Generation Partnership Project (3GPP), Mobile Competence Centre, 650, Route Des Lucioles ; F-06921 Sophia-Antipolis Cedex, France, vol. RAN WG1, No. Hangzhou, China; May 15, 2017-May 19, 2017, May 14, 2017 (May 14, 2017), pp. 1-5, XP051273563, Retrieved from the Internet: URL: http://www.3gpp.org/ftp/Meetings_3GPP_SYNC/RAN/Docs/[retrieved on May 14, 2017], p. 1, Paragraph 1, p. 2, Paragraph 2-Paragraph 2.1.

* cited by examiner

CONTROL ELEMENT RESOURCE MAPPING SCHEMES IN WIRELESS SYSTEMS

CROSS REFERENCES

The present Application for Patent claims the benefit of U.S. Provisional Patent Application No. 62/622,786 by HOSSEINI, et al., entitled "Control Element Resource Mapping Schemes in Wireless Systems," filed Jan. 26, 2018, assigned to the assignee hereof, and expressly incorporated herein.

BACKGROUND

The following relates generally to wireless communications, and more specifically to control element resource mapping schemes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems support low latency communication between a base station and a UE using shortened transmission time intervals (sTTIs). A base station may transmit control information in a control channel within the sTTI to schedule downlink transmissions or uplink transmissions within the sTTI. In some cases, shortened resource element groups (sREGs) within shortened control channel elements (sCCEs) may be non-homogenously or otherwise non-ideally mapped among a resource set available for the transmission of control information. More efficient techniques for mapping sREGs to sCCEs are desired.

SUMMARY

The described techniques relate to improved methods, systems, devices or apparatuses that support control element resource mapping schemes. Generally, the described techniques provide for mapping schemes used to map resource element groups (REGs) or shortened REGs (sREGs) to control channel elements (CCEs) or shortened CCEs (sCCEs). According to some aspects, mapping schemes may be based on the number of available symbols in a resource set (e.g., a resource block (RB) set) for a shortened physical downlink control channel (sPDCCH) (e.g., whether an odd or even number of symbols are available in a given symbol of an RB set). Further, different mapping schemes may be initiated based on the number of sREGs per sCCE, the number of sCCEs in a resource set, the number of symbols within a resource set, some combination of these, and/or other factors. In accordance with some aspects, a uniform distribution of REGs within available symbols may be mapped to CCEs and a uniform distribution of unused resource blocks (RBs) may be made available for additional communication procedures, including those related to legacy communications. In some cases, the mapping schemes described herein may ensure that sREGs within an sCCE are indexed into only a single symbol or uniformly or evenly across multiple symbols (e.g., a set of sREGs mapped to an sCCE within a first symbol and a set of sREGs mapped to the sCCE in a second symbol share the same frequency resources). The mapping schemes may be applicable for localized and/or distributed sPDCCH mapping.

A method of wireless communications is described. The method may include identifying a resource set for transmission of a set of CCEs to at least one user equipment (UE), wherein the resource set comprises multiple REGs and multiple symbols, determining a mapping scheme for mapping REGs of the resource set to CCEs of the set of CCEs based at least in part on a number of REGs in a symbol of the multiple symbols of the resource set, mapping REGs to each CCE of the set of CCEs based at least in part on the mapping scheme, and transmitting the mapped REGs to the at least one UE.

An apparatus for wireless communications is described. The apparatus may include means for identifying a resource set for transmission of a set of CCEs to at least one UE, wherein the resource set comprises multiple REGs and multiple symbols, means for determining a mapping scheme for mapping REGs of the resource set to CCEs of the set of CCEs based at least in part on a number of REGs in a symbol of the multiple symbols of the resource set, means for mapping REGs to each CCE of the set of CCEs based at least in part on the mapping scheme, and means for transmitting the mapped REGs to the at least one UE.

Another apparatus for wireless communications is described. The apparatus may include a processor, memory in electronic communication with the processor, and instructions stored in the memory. The instructions may be operable to cause the processor to identify a resource set for transmission of a set of CCEs to at least one UE, wherein the resource set comprises multiple REGs and multiple symbols, determine a mapping scheme for mapping REGs of the resource set to CCEs of the set of CCEs based at least in part on a number of REGs in a symbol of the multiple symbols of the resource set, map REGs to each CCE of the set of CCEs based at least in part on the mapping scheme, and transmit the mapped REGs to the at least one UE.

A non-transitory computer-readable medium for wireless communications is described. The non-transitory computer-readable medium may include instructions operable to cause a processor to identify a resource set for transmission of a set of CCEs to at least one UE, wherein the resource set comprises multiple REGs and multiple symbols, determine a mapping scheme for mapping REGs of the resource set to CCEs of the set of CCEs based at least in part on a number of REGs in a symbol of the multiple symbols of the resource set, map REGs to each CCE of the set of CCEs based at least in part on the mapping scheme, and transmit the mapped REGs to the at least one UE.

Some examples of the method, apparatus, and non-transitory computer-readable medium described above may further include processes, features, means, or instructions for determining the mapping scheme based at least in part on a number of symbols of the resource set.

Some examples of the method, apparatus, and non-transitory computer-readable medium described above may further include processes, features, means, or instructions for determining the mapping scheme based at least in part on a number of REGs in each CCE of the set of CCEs.

Some examples of the method, apparatus, and non-transitory computer-readable medium described above may further include processes, features, means, or instructions for determining the mapping scheme based at least in part on a number of CCEs in the set of CCEs.

Some examples of the method, apparatus, and non-transitory computer-readable medium described above may further include processes, features, means, or instructions for transmitting a resource set configuration to the at least one UE, wherein the mapping scheme may be determined based at least in part on the resource set configuration.

In some examples of the method, apparatus, and non-transitory computer-readable medium described above, the resource set configuration may be transmitted via RRC signaling.

In some examples of the method, apparatus, and non-transitory computer-readable medium described above, mapping REGs to each CCE comprises: mapping a first set of REGs to a single CCE of the set of CCEs uniformly across two symbols of the multiple symbols of the resource set.

In some examples of the method, apparatus, and non-transitory computer-readable medium described above, mapping REGs to each CCE comprises: mapping REGs to a first subset of CCEs within a first symbol of the multiple symbols of the resource set and mapping REGs to a second subset of CCEs within a second symbol of the multiple symbols of the resource set.

In some examples of the method, apparatus, and non-transitory computer-readable medium described above, mapping REGs to each CCE comprises: mapping respective REGs for respective CCEs within a same symbol of the multiple symbols of the resource set.

In some examples of the method, apparatus, and non-transitory computer-readable medium described above, mapping REGs to each CCE comprises: mapping REGs for a first CCE in a distributed pattern with respect to REGs for a second CCE within a same symbol of the resource set.

In some examples of the method, apparatus, and non-transitory computer-readable medium described above, mapping REGs to each CCE comprises: mapping each set of REGs for each CCE across the multiple symbols such that each set of REGs may be mapped within a single symbol.

In some examples of the method, apparatus, and non-transitory computer-readable medium described above, the mapping scheme comprises one of a distributed mapping scheme or a localized mapping scheme.

In some examples of the method, apparatus, and non-transitory computer-readable medium described above, the resource set comprises an odd number of REGs in each symbol of multiple symbols of the resource set. In some examples of the method, apparatus, and non-transitory computer-readable medium described above, the REGs may be mapped to each CCE according to $nN_{SREG}^{SCCE}+1+j$, where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

In some examples of the method, apparatus, and non-transitory computer-readable medium described above, the REGs may be mapped to each CCE according to $$N_{SREG}^{SCCE} \cdot \left(n \bmod \left\lfloor \frac{N_{RB}^{X_m}}{N_{SREG}^{SCCE}} \right\rfloor\right) + \left\lfloor \frac{n}{\left\lfloor \frac{N_{RB}^{X_m}}{N_{SREG}^{SCCE}} \right\rfloor} \right\rfloor \cdot (N_{RB}^{X_m} + N_{RB}^{X_m} \bmod N_{SREG}^{SCCE}) + j,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

In some examples of the method, apparatus, and non-transitory computer-readable medium described above, the REGs may be mapped to each CCE according to $$n \bmod \left\lfloor \frac{N_{RB}^{X_m}}{N_{SREG}^{SCCE}} \right\rfloor + \left\lfloor \frac{n}{\left\lfloor \frac{N_{RB}^{X_m}}{N_{SREG}^{SCCE}} \right\rfloor} \right\rfloor \cdot (N_{RB}^{X_m} + N_{RB}^{X_m} \bmod N_{SREG}^{SCCE}) + j \left\lfloor \frac{N_{RB}^{X_m}}{N_{SREG}^{SCCE}} \right\rfloor,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

A method of wireless communications is described. The method may include receiving, from a base station, a resource set configuration that identifies a resource set for one or more CCEs, wherein the resource set comprises multiple REGs and multiple symbols, determining a mapping scheme for mapping REGs of the resource set to the one or more CCEs based at least in part on the resource set configuration and a number of REGs in a symbol of the multiple symbols of the resource set, monitoring the resource set for at least one of the one or more CCEs based at least in part on the mapping scheme, and decoding the at least one CCE based at least in part on the monitoring.

An apparatus for wireless communications is described. The apparatus may include means for receiving, from a base station, a resource set configuration that identifies a resource set for one or more CCEs, wherein the resource set comprises multiple REGs and multiple symbols, means for determining a mapping scheme for mapping REGs of the resource set to the one or more CCEs based at least in part on the resource set configuration and a number of REGs in a symbol of the multiple symbols of the resource set, means for monitoring the resource set for at least one of the one or more CCEs based at least in part on the mapping scheme, and means for decoding the at least one CCE based at least in part on the monitoring.

Another apparatus for wireless communications is described. The apparatus may include a processor, memory in electronic communication with the processor, and instructions stored in the memory. The instructions may be operable to cause the processor to receive, from a base station, a resource set configuration that identifies a resource set for one or more CCEs, wherein the resource set comprises multiple REGs and multiple symbols, determine a mapping scheme for mapping REGs of the resource set to the one or more CCEs based at least in part on the resource set configuration and a number of REGs in a symbol of the multiple symbols of the resource set, monitor the resource set for at least one of the one or more CCEs based at least in part on the mapping scheme, and decode the at least one CCE based at least in part on the monitoring.

A non-transitory computer-readable medium for wireless communications is described. The non-transitory computer-readable medium may include instructions operable to cause a processor to receive, from a base station, a resource set configuration that identifies a resource set for one or more CCEs, wherein the resource set comprises multiple REGs and multiple symbols, determine a mapping scheme for mapping REGs of the resource set to the one or more CCEs based at least in part on the resource set configuration and a number of REGs in a symbol of the multiple symbols of the resource set, monitor the resource set for at least one of the one or more CCEs based at least in part on the mapping scheme, and decode the at least one CCE based at least in part on the monitoring.

Some examples of the method, apparatus, and non-transitory computer-readable medium described above may further include processes, features, means, or instructions for determining the mapping scheme based at least in part on a number of symbols of the resource set.

Some examples of the method, apparatus, and non-transitory computer-readable medium described above may further include processes, features, means, or instructions for determining the mapping scheme based at least in part on a number of REGs in each CCE of the one or more CCEs.

Some examples of the method, apparatus, and non-transitory computer-readable medium described above may further include processes, features, means, or instructions for determining the mapping scheme based at least in part on a number of CCEs in the one or more CCEs.

In some examples of the method, apparatus, and non-transitory computer-readable medium described above, the resource set configuration may be received via RRC signaling.

In some examples of the method, apparatus, and non-transitory computer-readable medium described above, a first set of REGs may be mapped to a first CCE of the one or more CCEs uniformly across two symbols of the multiple symbols of the resource set according to the mapping scheme.

In some examples of the method, apparatus, and non-transitory computer-readable medium described above, a respective REGs may be mapped to respective CCEs within a same symbol of the multiple symbols of the resource set according to the mapping scheme.

In some examples of the method, apparatus, and non-transitory computer-readable medium described above, a respective REGs may be mapped to a first CCE in distributed pattern with respect to REGs mapped to a second CCE within a same symbol of the resource set according to the mapping scheme.

In some examples of the method, apparatus, and non-transitory computer-readable medium described above, a REGs may be mapped to a first subset of CCEs within a first symbol of the multiple symbols of the resource set and REGs may be mapped to a second subset of CCEs within a second symbol of the multiple symbols of the resource set.

In some examples of the method, apparatus, and non-transitory computer-readable medium described above, each set of REGs may be mapped to each CCE across the multiple symbols such that each set of REGs may be within a single symbol.

In some examples of the method, apparatus, and non-transitory computer-readable medium described above, the mapping scheme comprises one of a distributed mapping scheme or a localized mapping scheme.

In some examples of the method, apparatus, and non-transitory computer-readable medium described above, the resource set comprises an odd number of REGs in each symbol of multiple symbols of the resource set. In some examples of the method, apparatus, and non-transitory computer-readable medium described above, the REGs may be mapped to each CCE according to $nN_{SREG}^{SCCE}+1+j$, where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

In some examples of the method, apparatus, and non-transitory computer-readable medium described above, the REGs may be mapped to each CCE according to $$N_{SREG}^{SCCE} \cdot \left(n \bmod \left\lfloor \frac{N_{RB}^{X_m}}{N_{SREG}^{SCCE}} \right\rfloor\right) + \left\lfloor \frac{n}{\left\lfloor \frac{N_{RB}^{X_m}}{N_{SREG}^{SCCE}} \right\rfloor} \right\rfloor \cdot \left(N_{RB}^{X_m} + N_{RB}^{X_m} \bmod N_{SREG}^{SCCE}\right) + j,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

In some examples of the method, apparatus, and non-transitory computer-readable medium described above, the REGs may be mapped to each CCE according to $$n \bmod \left\lfloor \frac{N_{RB}^{X_m}}{N_{SREG}^{SCCE}} \right\rfloor + \left\lfloor \frac{n}{\left\lfloor \frac{N_{RB}^{X_m}}{N_{SREG}^{SCCE}} \right\rfloor} \right\rfloor \cdot \left(N_{RB}^{X_m} + N_{RB}^{X_m} \bmod N_{SREG}^{SCCE}\right) + j \left\lfloor \frac{N_{RB}^{X_m}}{N_{SREG}^{SCCE}} \right\rfloor,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

DETAILED DESCRIPTION

Figure 1:
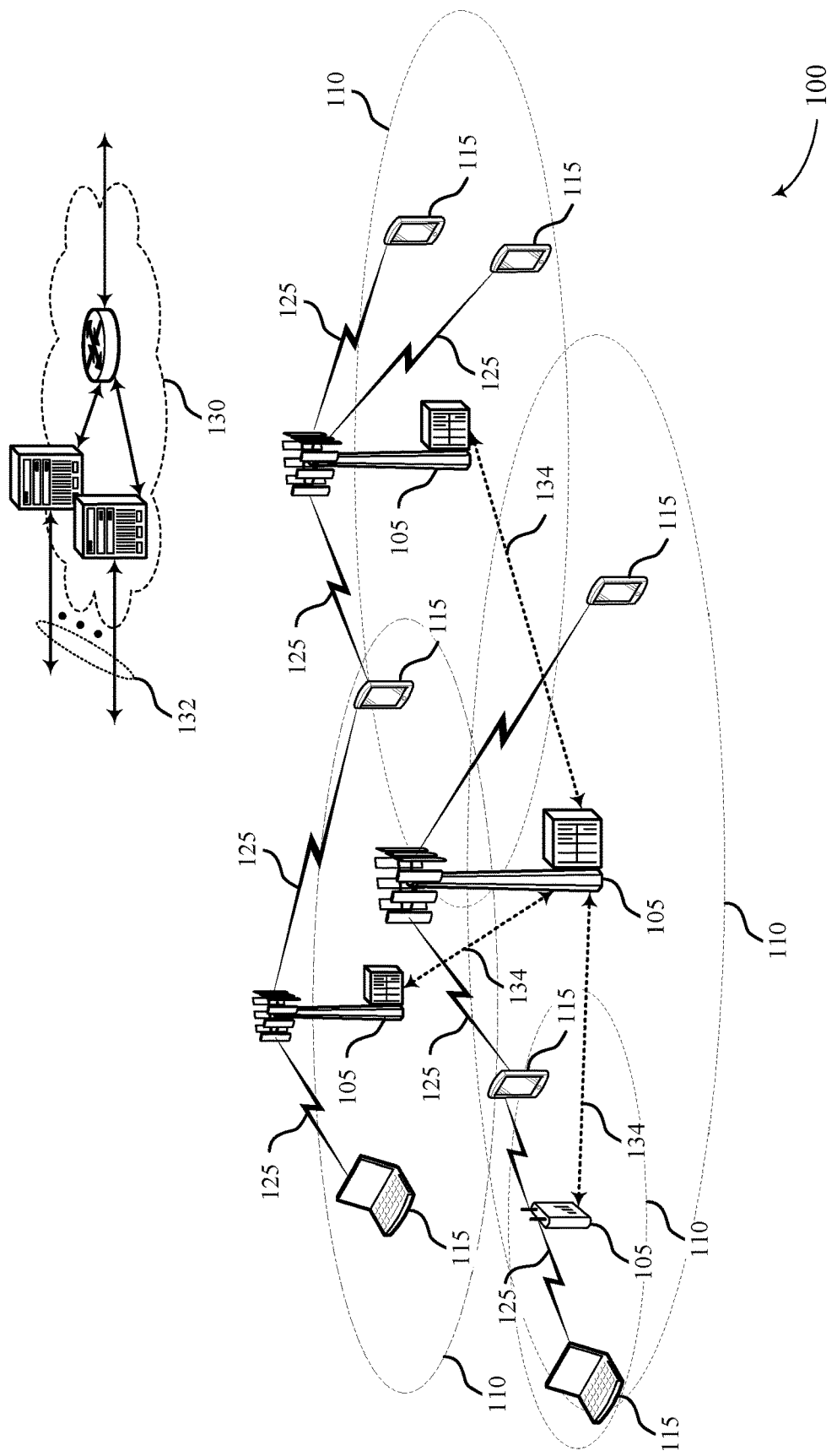
FIG. 1 illustrates an example of a wireless communications system that supports control element resource mapping schemes in accordance with aspects of the present disclosure.

Some shortened resource element group (sREG) mapping schemes may index sREGs to available resource blocks (RBs) within a set of symbols. For cell-specific reference signal (CRS) based shortened physical downlink control channel (sPDCCH), sREGs within an RB set may be numbered in a frequency-first time-second manner. The indexing may be performed from the lowest RB index to the highest RB index over the first symbol, and from the highest RB index to the lowest RB index over the second symbol. This indexing may allow for certain localized mapping.

Some sREG mapping schemes, however, may create problems for symbols that contain an odd number of RBs (among other scenarios). In such cases, for example, some sCCEs may include sREGs that are located across two symbols (e.g., an sCCE that contains 4 sREGs may include 3 sREGs in a first symbol and 1 sREG in a second symbol). Such a non-homogenous distribution may waste RBs that are contained within the RB set, but not being used for a given sCCE. In these cases, the unused RBs in one symbol may share frequency resources (e.g., a subcarrier) with sREGs mapped to an sCCE in a different symbol. Mappings based on this indexing may result in sCCEs experiencing different channel conditions or spanning multiple symbols which may lead to latency issues and other deleterious effects.

In some cases, it may be beneficial to ensure that sREGs within a single symbol are mapped to a given sCCE. In ultra-reliable low-latency communications (URLLC), for example, this may allow the sCCEs over a first symbol to be decoded with reduced latency (without having to decode a second symbol that may contain one or more sREGs for a given sCCE), which may reduce latency.

An RB set may contain multiple RBs and multiple symbols and the format of the RB set may be indicated by a base station to a user equipment (UE) (e.g., via radio resource control (RRC) signaling). Each RB within the RB set may include twelve resource elements (REs), each of which may span a single subcarrier in the frequency domain and a single OFDM symbol in the time domain. An sREG may consist of one RB and multiple sREGs may be mapped to an sCCE based on the format of the RB set. In some examples, a base station may determine or otherwise obtain information related to the format of the RB set (e.g., from a core network node). This information may be indicated to the UE in a resource set configuration which may indicate the control resources for an sPDCCH within a shortened transmission time interval (sTTI).

According to some aspects, a mapping scheme may be determined and used by a base station to map sREGs (or REGs) to one or more sCCEs (or CCEs). The mapping scheme may be based on a number of sREGs or RBs in each symbol of the RB set allocated for sPDCCH. For instance, in a localized mapping scheme, different mapping schemes may be used depending on whether an odd number or an even number of sREGs or RBs are in a symbol of the RB set. Further, in some cases, different mapping schemes may ensure that sREGs mapped to a given sCCE do not span across multiple symbols and if they do, they are mapped uniformly across the multiple symbols (e.g., two sREGs of an sCCE are mapped to a first symbol of an RB set and two sREGs of the sCCE are mapped to a second symbol of the RB set such that the sREGs of the sCCE mapped across the first and second symbols share frequency resources (e.g., subcarriers)). Distributed mapping schemes may also be determined and utilized to map sREGs to an sCCE in an alternating or distributed manner depending on the number of sCCEs mapped within a given symbol. These mapping schemes may be employed to allow for more efficient utilization of resource within an RB set and to reduce latency in low latency communications systems.

Aspects of the disclosure are initially described in the context of wireless communications systems. Aspects are then described with respect to resource structures and a process flow. Aspects of the disclosure are further illustrated by and described with reference to apparatus diagrams, system diagrams, and flowcharts that relate to control element resource mapping schemes.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

For CRS based sPDCCH, some mapping schemes may number sREGs within an RB set in a frequency-first time-second manner such that indexing is performed from the lowest RB index to the highest RB index over the first symbol, and from the highest RB index to the lowest RB index over the second symbol. This indexing may allow for certain localized mapping, but in some cases, may result in uneven distribution of sREGs for a given sCCE across multiple symbols. For instance, according to some mapping schemes, the number of RBs available for sPDCCH may vary such that sREGs within an RB set may be mapped to sCCEs in a non-homogenous manner across multiple symbols, which may lead to increased latency during decoding (e.g., because the UE 115 receiving the sCCEs has to perform decoding across multiple symbols instead of one) or variations in channel conditions during transmission of the sREGs (e.g., an sREG in the first symbol may experience different interference than an sREG in the second symbol), among other issues.

In one example, an odd number of RBs may be within a symbol of an RB set for sPDCCH. As a result, some sCCEs may include sREGs that are located across two symbols (e.g., an sCCE that contains 4 sREGs may include 3 sREGs in a first symbol and 1 sREG in a second symbol). Such a non-homogenous distribution may waste RBs within the RB set that are left unused after sREG mapping because the unused RBs in one symbol may share frequency resources (e.g., a subcarrier) with sREGs mapped to an sCCE in a different symbol. Further, some systems are not capable of scheduling resources at the granularity of a single sREG or RB within a symbol. Thus, due to the non-homogenous distribution, mapping schemes based on this indexing that do not account for the number of RBs in a given symbol of an RB set may result in sCCEs experiencing different channel conditions, latency issues, or inefficient utilization of resources, among other issues.

Wireless communications system 100 may implement improved resource mapping schemes which may be based on the number of RBs within a symbol of an RB set. In some cases, the mapping schemes may be based on the number of sREGs per sCCE or the number of symbols within an RB set and the mapping schemes may vary for localized and distributed sPDCCH mapping. In addition, some mapping schemes may ensure that sREGs mapped to an sCCE are located with only one symbol or the sREGs are uniformly mapped to an sCCE across multiple symbols.

Figure 2:
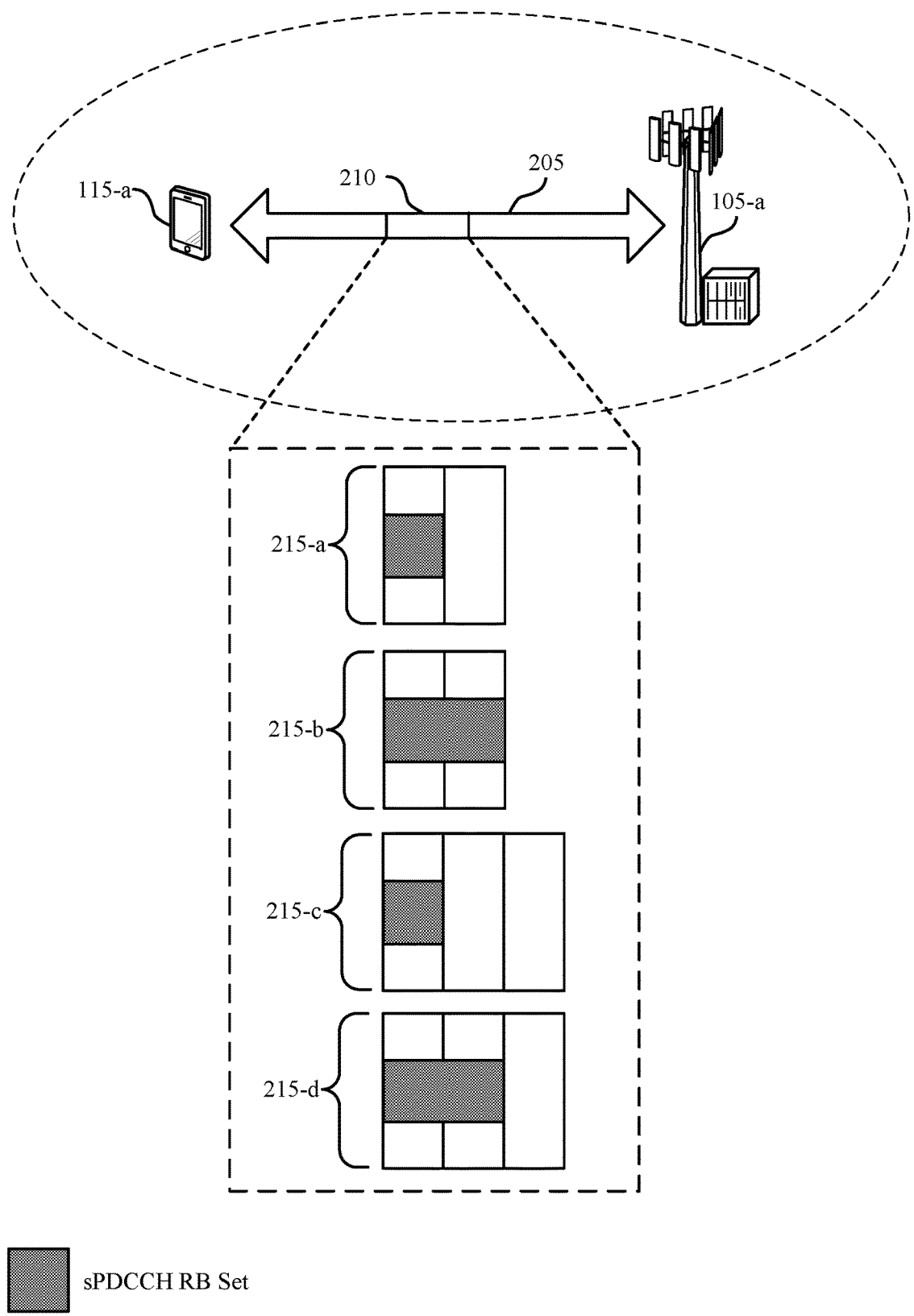
FIG. 2 illustrates an example of a wireless communications system that supports control element resource mapping schemes in accordance with aspects of the present disclosure.

FIG. 2 illustrates an example of a wireless communications system 200 that supports control element resource mapping schemes in accordance with various aspects of the present disclosure. In some examples, wireless communications system 200 may implement aspects of wireless communications system 100. Wireless communications system 200 includes base station 105-a and UE 115-a, which may be examples of the corresponding devices described with reference to FIG. 1. Base station 105-a may provide communication coverage for a coverage area 110-a and may communicate with UE 115-a on resources of a carrier 205.

In some cases, carrier 205 may include a frame 210 which may include a plurality of sTTIs 215. Base station 105-a may schedule communication within an sTTI 215 on carrier 205 via an sPDCCH in the sTTI 215 (e.g., in a control region of the sTTI). In some examples, base station 105-a may transmit control information such as a DCI via resources allocated for the sPDCCH within an sTTI 215. The sPDCCH may include one or more sCCEs, each of which may include multiple sREGs. In some cases, sCCEs within the sPDCCH may include a fixed number of sREGs (e.g., 4). In other cases, sCCEs within the sPDCCH may include a variable number of sREGs (e.g., 1, 2, 3, 4, 8, 16).

sTTIs 215 may each include multiple symbols (e.g., two (2) or three (3)) symbols, and each sTTI 215 may be self-contained. That is, each sTTI 215 may include a control region used for transmitting control information (e.g., DCI) via an sPDCCH. The control region may be structured as an RB set, and the RB set may include a plurality of sREGs mapped to corresponding sCCEs.

In some cases, the sPDCCH RB set may be allocated to at least the first symbol of each sTTI 215 and may span multiple symbols of the sTTI 215. As an example, sTTI 215-a is a two-symbol sTTI that includes an sPDCCH RB set that spans the first symbol of sTTI 215-a. sTTI 215-b is an example of a two-symbol sTTI that includes an sPDCCH RB set spanning both symbols of sTTI 215-b. sTTI 215-c is an example of a three-symbol sTTI that includes an sPDCCH RB set that spans only the first symbol, and sTTI 215-d is an example of a three-symbol sTTI that includes an sPDCCH RB set that spans the first two symbols.

The format and thus the arrangement of the sPDCCH RB set for a given sTTI may be determined by a base station 105-a (or another core network node) and may be indicated to the UE 115-a via signaling that indicates a resource set configuration. The resource set configuration may be transmitted to the UE 115-a via RRC signaling and the UE 115-a may use the resource set configuration to determine the sPDCCH RB set. The UE 115-a may identify a mapping scheme used for mapping sREGs of the sPDCCH RB set to one or more sCCEs and may monitor the sPDCCH RB set in order to decode one or more sCCEs to obtain control information for the UE 115-a. The sREGs of the RB set for an sPDCCH may be mapped according to a mapping scheme as described in detail with respect to FIGS. 3 through 6.

Figure 3:
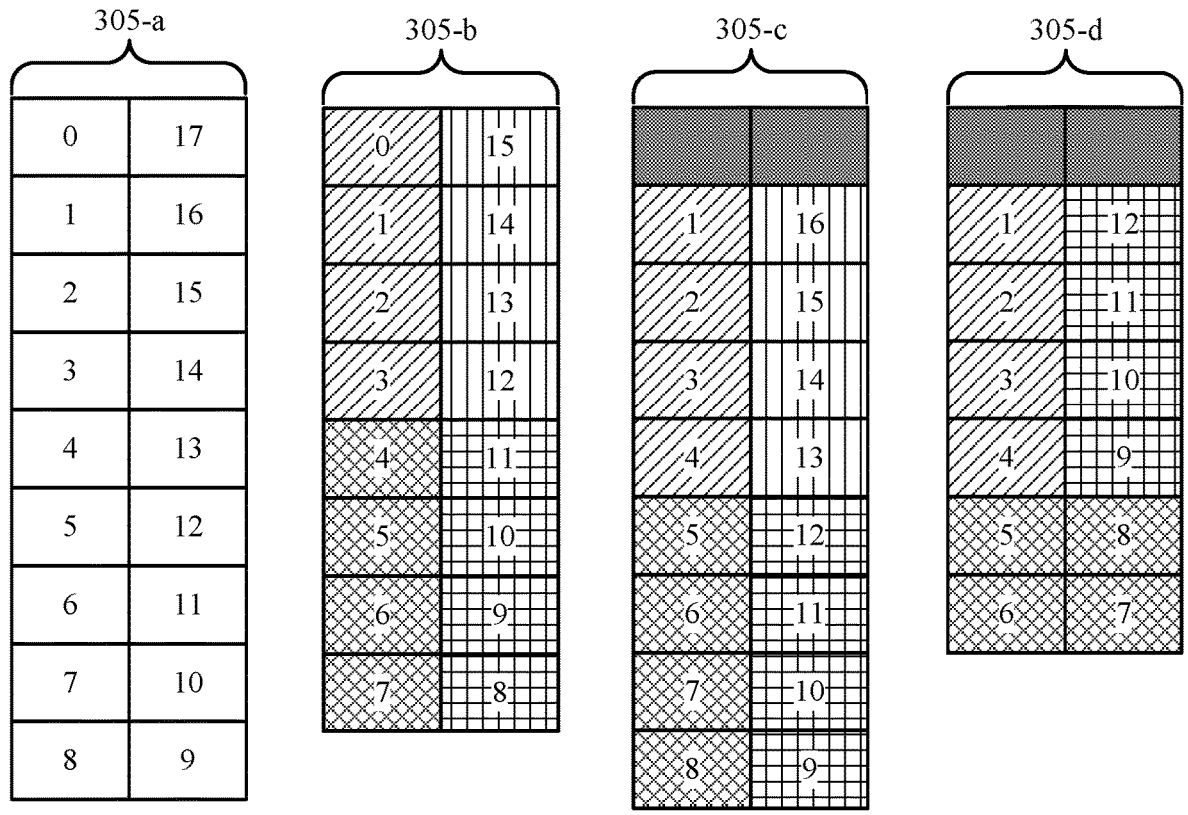
FIG. 3 illustrates an example of a resource structure that supports control element resource mapping schemes in accordance with aspects of the present disclosure.
Figure 3:
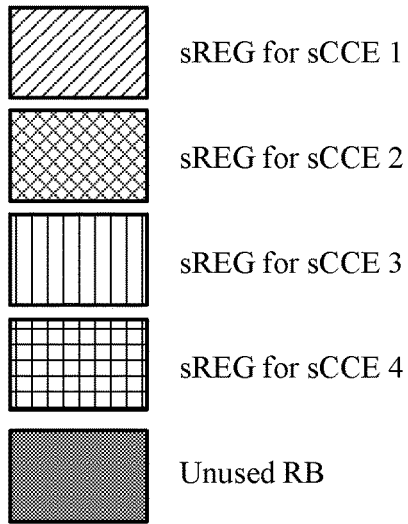

FIG. 3 illustrates an example of a resource structure 300 that supports control element resource mapping schemes in accordance with various aspects of the present disclosure. In some examples, resource structure 300 may implement aspects of wireless communications systems 100 or 200 as described with reference to FIGS. 1 and 2. As shown, resource structure 300 includes multiple RB sets 305, each of which may carry control information from a base station 105 to a UE 115. Each RB set 305 may include multiple RBs or sREGs and may span a set of symbols of an sTTI (e.g., the first one, two, or three symbols of a TTI, sTTI, slot, mini-slot, etc.).

An sREG may correspond to one RB that spans a single symbol in the time domain and twelve subcarriers in the frequency domain. In some cases, sREGs are numbered within an RB set 305 in a frequency-first time-second manner. For example, as shown in RB sets 305, sREGs are numbered beginning from the lowest RB index to the highest RB index over the first symbol of the RB set 305, and then from the highest RB index to the lowest RB index over the second symbol of the RB set 305. Four sREGs may be mapped to an sCCE, which may contain control information for one or more UEs 115.

Some localized mapping schemes do not account for the number of RBs in a given symbol of an RB set 305. For example, as shown with respect to RB set 305-a, a set of sREGs (e.g., 1, 2, 4, 6, 18 sREGs) may be mapped to RBs within an RB set 305-a that includes an odd number of RBs per symbol (e.g., RB set 305-*a* includes 9 RBs per symbol). In this instance, when mapping according to some mapping schemes, sREGs 0-3 belonging to sCCE 1 having an index of n=0 may be mapped to the lowest four RBs of the first symbol of RB set 305-*a*, sREGs 4-7 belonging to sCCE 2 having an index of n=1 may be mapped to the following four RBs of the first symbol of RB set 305-*a*. Further, sREGs 8-11 belonging to sCCE 3 having an index of n=2 may be mapped such that sREG 8 is mapped to the highest indexed RB of the first symbol of RB set 305-*a* and sREGs 9-11 are mapped to the highest three indexed RBs of the second symbol of RB set 305-*a*, and sREGs 12-15 belonging to sCCE 4 having an index of n=3 may be mapped to the four RBs that are indexed lower than RBs of sREG 11.

Such a mapping results in sREGs of sCCE 3 unevenly (or non-homogenously) spanning the two symbols of RB set 305-*a* (i.e., the first sREG of sCCE 3 is included in the first symbol of RB set 305-*a* and the remaining three sREGs of sCCE 3 are included in the second symbol of RB set 305-*a*). This mapping scheme may lead to increased latency during decoding (e.g., because the UE 115 receiving sCCE 3 has to perform decoding across multiple symbols instead of one) or variations in channel conditions during transmission of the sREGs (e.g., sREG 8 in the first symbol of RB set 305-*a* may experience different interference than sREG 11 in the second symbol of RB set 305-*a*), among other issues. Such a non-homogenous distribution may waste RBs within the RB set that are left unused after sREG mapping because the unused RBs in one symbol may share frequency resources (e.g., a subcarrier) with sREGs mapped to an sCCE in a different symbol (e.g., the unused resources of the second symbol of RB set 305-*a* share frequency resources with sREGs 0 and 1 sCCE 1). Further, some systems are not capable of scheduling resources at the granularity of a single sREG or RB within a symbol. Thus, due to the non-homogenous distribution, mapping schemes based on this indexing that do not account for the number of RBs in a given symbol of an RB set may result in sCCEs experiencing different channel conditions, latency issues, or inefficient utilization of resources, among other issues.

According to some aspects, a set of sREGs (e.g., 1, 2, 4, 8, 16 sREGs) may be mapped to RBs within an RB set 305 according to a localized mapping scheme that may depend on the number of RBs within a symbol (or each symbol) of the RB set 305. For instance, the number of RBs in one symbol of an RB set 305 may be even, as is shown by RB set 305-*b* which includes eight RBs. In such a case, the sREGs of an RB set 305 may be mapped according to a localized mapping scheme denoted by Equation 1 below.

$$nN_{SREG}^{sCCE}+j \qquad (1)$$

In Equation 1, n is an sCCE index, $N_{SREG}^{sCCE}$ is the number of sREGs per sCCE (4 in this case), $j \in \{0, \ldots, N_{SREG}^{sCCE}-1\}$, $$n \in \left\{0, \ldots, Ns * \left\lfloor \frac{N_{RB}^{X_m}}{N_{SREG}^{sCCE}} \right\rfloor - 1 \right\},$$

and Ns is a number of symbols in the RB set 305. As shown in RB set 305-*b*, sREGs 0-3 are mapped to sCCE 1 having an index of n=0, sREGs 4-7 are mapped to sCCE 2 having an index of n=1, sREGs 8-11 are mapped to sCCE 3 having an index of n=2, and sREGs 12-15 are mapped to sCCE 4 having an index n=3. Using the mapping scheme determined based on Equation 1, each of sCCEs 1 through 4 have corresponding sREGs within a single symbol (either the first or the second symbol) of RB set 305-*b*. Moreover, all resources of RB set 305-*b* are being utilized for the sCCEs and none of the sCCEs have sREGs in more than one symbol.

In some examples, the number of RBs forming an RB set per symbol may be odd, as shown by RB set 305-*c* where each symbol includes seven RBs. In such a case, the sREGs of RB set 305-*c* may be mapped to sCCEs according to a second mapping scheme denoted by Equation 2 below.

$$nN_{SREG}^{sCCE}+1+j \qquad (2)$$

Equation 2 may homogenize the distribution of the unused RBs and sREGs of an sCCE that would have otherwise non-homogenously spanned two symbols of an RB set 305. That is, the second mapping scheme may result in the unused RBs sharing a frequency band across the two symbols of RB set 305-*c*.

As shown in RB set 305-*c*, the second mapping scheme may result in a homogenous distribution of the unused resources (as shown in the lowest indexed RBs of the first and second symbol of RB set 305-*c*) while preventing the spanning of an sCCE across the two symbols of RB set 305-*c*. In such an example, the sREGs (1-4) of the first sCCE and the sREGs (5-8) of the second sCCE may be within the first symbol of RB set 305-*c* without spanning across both symbols of RB set 305-*c*. The sREGs (9-12) of the third sCCE and the sREGs (13-16) of the fourth sCCE may be within the second symbol of RB set 305-*c* without spanning across both symbols of RB set 305-*c*.

Preventing the spanning of an sCCE across two symbols of an RB set 305-*c* may be desired in ultra-reliable low-latency communications (URLLC), for example, as a UE 115 will not have to decode an sCCE over two symbol periods. Such a mapping scheme, therefore, may reduce latency and turn-around time within a wireless communications system.

Performing mapping according to Equation 2 may also result in uniform mapping of sREGs for a given sCCE across two symbols of an RB set 305 such that the sREGs share common frequency bands across the two symbols. For instance, as shown in RB set 305-*d*, a mapping scheme determined based on Equation 2 may result in a homogenous distribution of the unused resources (as shown in the lowest indexed RBs of the first and second symbol of RB set 305-*d*) and the sREGs of the second sCCE that span both symbols of RB set 305-*d* (as shown in sREGS 5-8 of the second sCCE, which span the highest two RB indexes of the first and second symbol of RB set 305-*d*).

Figure 4:
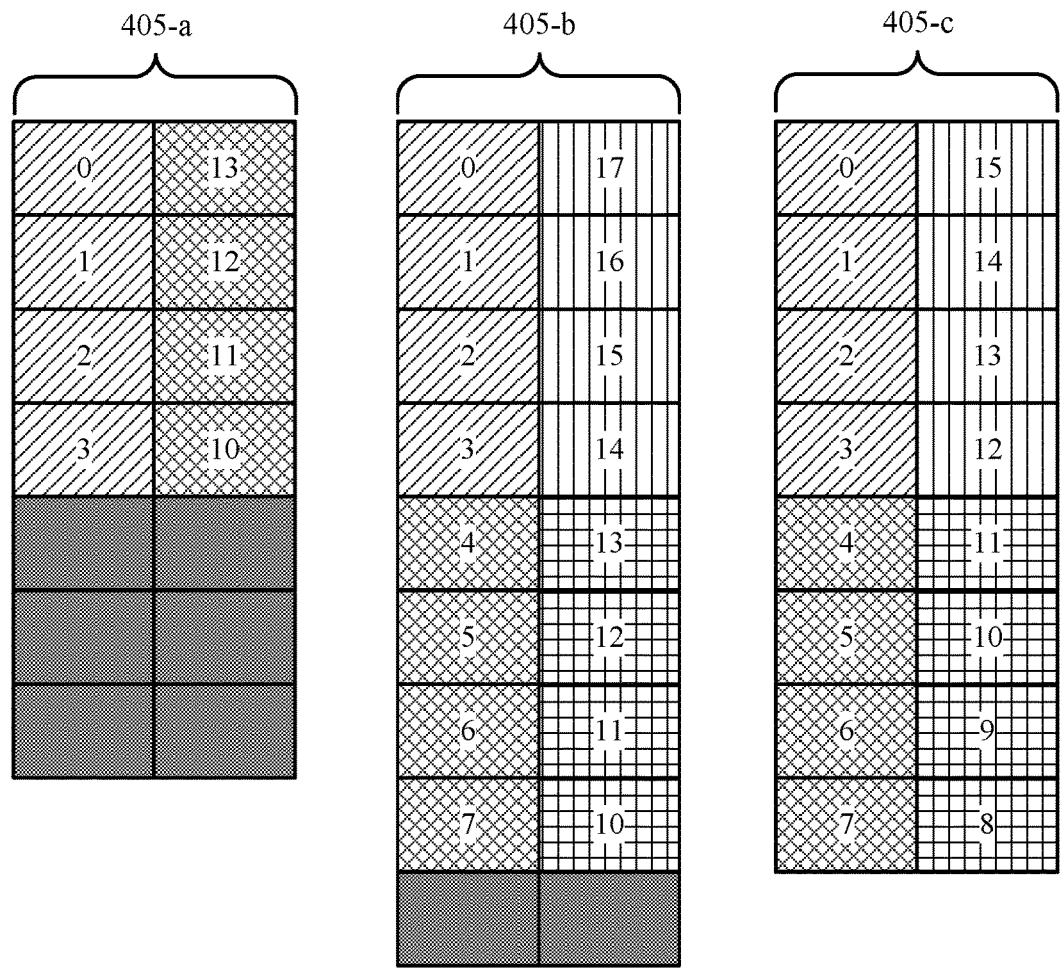
FIG. 4 illustrates an example of a resource structure that supports control element resource mapping schemes in accordance with aspects of the present disclosure.
Figure 4:
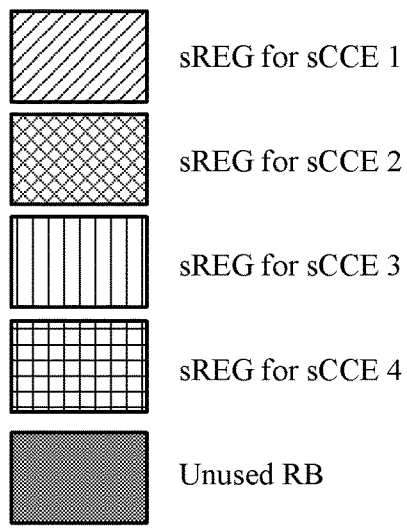

FIG. 4 illustrates an example of a resource structure 400 that supports control element resource mapping schemes in accordance with various aspects of the present disclosure. In some examples, resource structure 400 may implement aspects of wireless communications system 100 or 200 as described with reference to FIGS. 1 and 2. As shown, resource structure 400 includes multiple RB sets 405, which may carry control information from a base station 105 to a UE 115. Each RB set 405 may include multiple RBs and may span a set of symbols of an sTTI (e.g., the first one, two, or three symbols of a TTI, sTTI, slot, mini-slot, etc.).

Similar to FIG. 3, sREGs in RB sets 405 are numbered in a frequency-first time-second manner. According to some aspects, a set of sREGs (e.g., 1, 2, 4, 8, 16 sREGs) may be mapped to RBs within an RB set 405 according to a localized mapping scheme, which may be designed to prevent sREGs of a sCCE from being within more than one symbol. In such a case, the sREGs of an RB set 405 may be mapped according to a localized mapping scheme denoted by Equation 3 below.

$$N_{SREG}^{SCCE} \cdot \left(n \bmod \left\lfloor \frac{N_{RB}^{X_m}}{N_{SREG}^{SCCE}} \right\rfloor \right) + \left\lfloor \frac{n}{\left\lfloor \frac{N_{RB}^{X_m}}{N_{SREG}^{SCCE}} \right\rfloor} \right\rfloor \cdot (N_{RB}^{X_m} + N_{RB}^{X_m} \bmod N_{SREG}^{SCCE}) + j \quad (3)$$

In Equation 3, $$n \in \left\{0, \ldots, Ns * \left\lfloor \frac{N_{RB}^{X_m}}{N_{SREG}^{SCCE}} \right\rfloor - 1 \right\},$$

$j \in \{0, \ldots, N_{SREG}^{SCCE}-1\}$, $N_{SREG}^{SCCE}$ is the number of sREGs per sCCE (4 in this case), and $N_{RB}^{X_m}$ represents the number of sREGs per each configured OFDM symbol in the sPDCCH resource set $X_m$. Using a mapping scheme determined based on Equation 3, sREGs for sCCEs may be contained within a single symbol of the RB set 405. For example, as shown in RB set 405-a, sREGs 0-3 of a sCCE 1 having index n=0 may be the lowest four RB indexes of the first symbol and sREGs 10-13 of sCCE 2 having an index of n=1 may be the highest four RB indexes of the second symbol. Using such a mapping scheme may prevent sREGs belonging to an sCCE from spanning multiple symbols within RB set 405-a. Further, such a mapping scheme may result in the unused RBs being homogenously distributed across the symbols of RB set 405-a (e.g., the unused RBs on the first and second symbols of RB set 405-a span the same frequency resources (e.g., subcarriers)).

RB set 405-b depicts another example of sREG indexing according to the mapping scheme determined by Equation 3. As with the mapping in RB set 405-a, the sREG mapping within RB set 405-b does not include an sCCE having sREGs that span multiple symbols. For example, sREGs (0-3) mapped to sCCE 1 having an index of n=0 and sREGs (4-7) mapped to sCCE 2 having an index of n=1 are contained within the first symbol of RB set 405-b without spanning into the second symbol of RB set 405-b. Further, sREGs (10-13) mapped to sCCE 3 having an index of n=2 and sREGs (14-17) mapped to sCCE 4 having an index of n=3 are contained within the second symbol of RB set 405-b without spanning into the first symbol of RB set 405-b. Further, the unused RBs are homogenously distributed between the first and second symbol of RB set 405-b at the highest-indexed RB of the first symbol and the lowest index RB of the second symbol of RB set 405-b.

RB set 405-c depicts another example of sREG indexing according to the mapping scheme determined by Equation 3. As with the mapping in RB set 405-a, the sREG mapping within RB set 405-c does not include an sCCE having sREGs that span multiple symbols. For example, sREGs (0-3) mapped to sCCE 1 having an index of n=0 and sREGs (4-7) mapped to sCCE 2 having an index of n=1 are contained within the first symbol of RB set 405-c without spanning into the second symbol of RB set 405-c. Further, sREGs (8-11) mapped to sCCE 3 having an index of n=2 and sREGs (12-15) mapped to sCCE 4 having an index of n=3 are contained within the second symbol of RB set 405-c without spanning into the first symbol of RB set 405-c.

Figure 5:
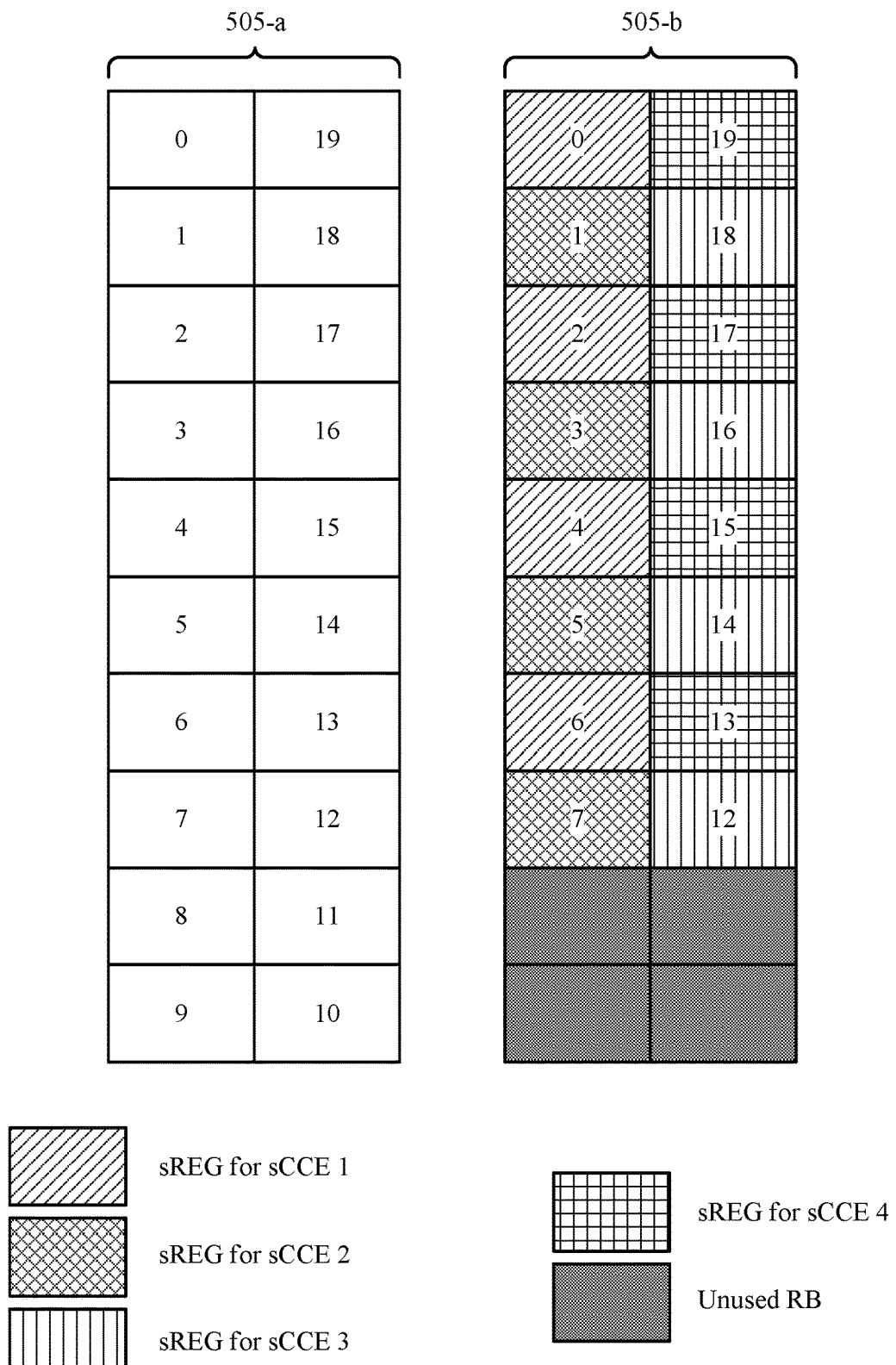
FIG. 5 illustrates an example of a resource structure that supports control element resource mapping schemes in accordance with aspects of the present disclosure.

FIG. 5 illustrates an example of a resource structure 500 that supports control element resource mapping schemes in accordance with various aspects of the present disclosure. In some examples, resource structure 500 may implement aspects of wireless communications system 100 or 200 as described with reference to FIGS. 1 and 2. As shown, resource structure 500 includes RB sets 505, which may carry control information from a base station 105 to a UE 115. RB sets 505 may include multiple RBs and may span a set of symbols of an sTTI (e.g., the first one, two, or three symbols of a TTI, sTTI, slot, mini-slot, etc.).

Some distributed mapping schemes do not account for the number of RBs in a given symbol of an RB set 505. For example, as shown with respect to RB set 505-a, a set of sREGs (e.g., 1, 2, 4, 6, 18 sREGs) may be mapped to RBs within an RB set 505-a. For example, sREGs 0, 2, 4, and 6 belonging to sCCE 1 having an index of n=0 may be mapped to the lowest, third lowest, fifth lowest, and seventh lowest RBs, respectively, of the first symbol of RB set 305-a, sREGs 1, 3, 5, and 7 belonging to sCCE 2 having an index of n=1 may be mapped to the second lowest, fourth lowest, sixth lowest, and eight lowest RBs, respectively, of the first symbol of RB set 305-a, sREGs 10, 12, 14, and 16 belonging to sCCE 3 having an index of n=2 may be mapped to the highest, third highest, fifth highest, and seventh highest RBs, respectively, of the second symbol of RB set 505-a, and sREGs 11, 13, 15, and 17 belonging to sCCE 4 having an index of n=3 may be mapped to the second highest, fourth highest, sixth highest, and eighth highest RBs, respectively, of the second symbol of RB set 505-a. Such a mapping results in the unused RBs of RB set 505-a being located in the highest two indexed RBs of the first symbol of RB set 505-a and the lowest two indexed RBs of the second symbol of RB set 505-b such that they are not homogenously distributed across RB set 505-a.

This mapping scheme may waste RBs within the RB set that are left unused after sREG mapping because the unused RBs in one symbol may share frequency resources (e.g., a subcarrier) with sREGs mapped to an sCCE in a different symbol (e.g., the unused resources of the first symbol of RB set 505-a share frequency resources with sREG 10 of sCCE 3 and sREG 11 of sCCE 4). Further, some systems are not capable of scheduling resources at the granularity of a single sREG or RB within a symbol. Thus, due to the non-homogenous distribution, mapping schemes based on this indexing may result in sCCEs experiencing different channel conditions, latency issues, or inefficient utilization of resources, among other issues.

According to some aspects, a set of sREGs (e.g., 1, 2, 4, 8, 16 sREGs) may be mapped to RBs within RB set 505-b according to a distributed mapping scheme, which may be designed to prevent sREGs of a sCCE from being within more than one symbol. In such a case, the sREGs of RB set 505-b may be mapped according to a distributed mapping scheme denoted by Equation 4 below.

$$n \bmod \left\lfloor \frac{N_{RB}^{X_m}}{N_{SREG}^{SCCE}} \right\rfloor + \left\lfloor \frac{n}{\left\lfloor \frac{N_{RB}^{X_m}}{N_{SREG}^{SCCE}} \right\rfloor} \right\rfloor \cdot (N_{RB}^{X_m} + N_{RB}^{X_m} \bmod N_{SREG}^{SCCE}) + j \left\lfloor \frac{N_{RB}^{X_m}}{N_{SREG}^{SCCE}} \right\rfloor \quad (4)$$

In Equation 4, $$n \in \left\{0, \ldots, Ns * \left\lfloor \frac{N_{RB}^{X_m}}{N_{SREG}^{SCCE}} \right\rfloor - 1 \right\},$$

$j \in \{0, \ldots, N_{SREG}^{sCCE}-1\}$, $N_{SREG}^{sCCE}$ is the number of sREGs per sCCE (4 in this case), and $N_{RB}^{X_m}$ represents the number of sREGs per each configured OFDM symbol in the sPDCCH resource set $X_m$. As shown in RB set 505-*b*, sREGs (0, 2, 4, and 6) of sCCE 1 having an index of n=0 and sREGs (1, 3, 5, and 7) of sCCE 2 having an index of n=1 may alternate in a distributed pattern within the first symbol of RB set 505-*b*. Further, sREGs (12, 14, 16, and 18) of sCCE 3 having an index of n=2 and sREGs (13, 15, 17, and 19) of sCCE 4 having an index of n=3 may alternate in a distributed pattern within the second symbol of RB set 505-*b*. Using such a mapping scheme may prevent sREGs mapped to an sCCE from spanning multiple symbols within RB set 505-*b*. Further, such a mapping scheme may result in the unused RBs being homogenously distributed across the two symbols of RB set 505-*b*. While only four CCEs are shown in FIG. 5, sREGs may be mapped to any number of sCCEs in an alternating or distributed fashion such that sREGs of a given sCCE do not span multiple symbols.

Figure 6:
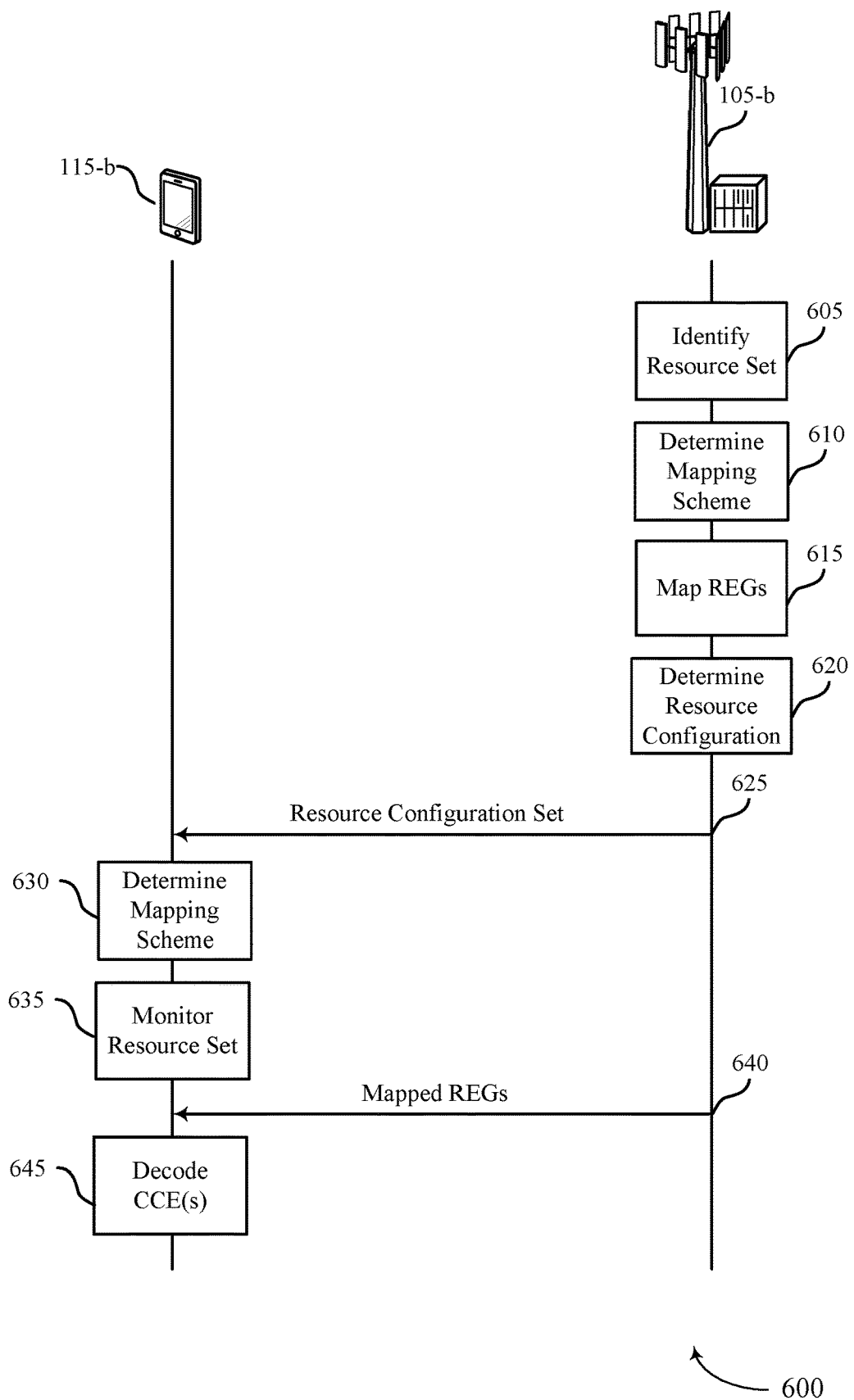
FIG. 6 illustrates an example of a process flow that supports control element resource mapping schemes in accordance with aspects of the present disclosure.

FIG. 6 illustrates an example of a process flow 600 that supports control element resource mapping schemes in accordance with various aspects of the present disclosure. In some examples, process flow 600 may implement aspects of wireless communications systems 100 or 200 as described with reference to FIGS. 1 and 2.

At 605, base station 105-*b* may identify a resource set (e.g., an RB set) for transmission of a set of CCEs or sCCEs to at least one UE 115-*b*, where the resource set may include multiple REGs or sREGs and multiple symbols.

At 610, base station 105-*b* may determine a mapping scheme for the set of CCEs based at least in part on a number of REGs in a symbol of the multiple symbols of the resource set. In some cases, base station 105-*b* may determine the mapping scheme for the set of CCEs based on whether the number of sREGs or RBs in a symbol is even or odd. In some cases, base station 105-*b* may determine the mapping scheme for the set of CCEs based on a number of REGs in each CCE of the set of CCEs or a number of CCEs in the set of CCEs.

At 615, base station 105-*b* may map REGs (or sREGs) of each CCE (or sCCE) of the set of CCEs to the resource set based on the mapping scheme. The mapping scheme may include a distributed mapping scheme or a localized mapping scheme. In some examples, base station 105-*b* may map a first set of REGs for a first CCE of the set of CCEs uniformly across two symbols of the multiple symbols of the resource set. Base station 105-*b* may map respective REGs for respective CCEs within a same symbol of the multiple symbols of the resource set. Base station 105-*b* may map REGs for a first CCE in an alternating pattern with respect to REGs for a second CCE within a same symbol of the resource set. Base station 105-*b* may map each set of REGs for each CCE across the multiple symbols such that each set of REGs is mapped within a single symbol.

In some examples, the resource set may comprise an odd number of REGs in each symbol of multiple symbols of the resource set. In such a case, the REGs of each CCE may be mapped according to Equation 2 as denoted in FIG. 3.

In some examples, the REGs of each CCE are mapped according to Equation 3 as denoted in FIG. 4. In other examples, the REGs of each CCE are mapped according to Equation 4 as denoted in FIG. 5.

At 620 base station 105-*b* may determine a resource set configuration for the at least one UE 115-*b* based at least in part on the mapping scheme.

At 625 base station 105-*b* may transmit, to UE 115-*b*, an indication of the resource set configuration (e.g., via RRC signaling).

At 630 UE 115-*b* may determine a mapping scheme for the one or more CCEs based at least in part on the indication of the resource set configuration. Determining the mapping scheme may be based at least in part on a number of REGs in a symbol of the multiple symbols of the resource set, which may be indicated via the resource set configuration. UE 115-*b* may determine the mapping scheme for the one or more CCEs based at least in part on a number of symbols of the resource set, a number of REGs in each CCE of the one or more CCEs, or a number of CCEs in the one or more CCEs.

In some examples, a first set of REGs for a first CCE of the one or more CCEs is mapped uniformly across two symbols of the multiple symbols of the resource set according to the mapping scheme. In another example, respective REGs for respective CCEs are mapped within a same symbol of the multiple symbols of the resource set according to the mapping scheme. In some cases, REGs for a first CCE are mapped in an alternating pattern with respect to REGs for a second CCE within a same symbol of the resource set according to the mapping scheme. Each set of REGs for each CCE may be mapped across the multiple symbols such that each set of REGs is within a single symbol.

In some examples, the resource set may comprise an odd number of REGs in each symbol of multiple symbols of the resource set. In such a case, the REGs of each CCE may be mapped according to Equation 2 as denoted in FIG. 3.

In some examples, the REGs of each CCE are mapped according to Equation 3 as denoted in FIG. 4. In other examples, the REGs of each CCE are mapped according to Equation 4 as denoted in FIG. 5.

At 635 UE 115-*b* may monitor the resource set for at least one of the one or more CCEs based at least in part on the mapping scheme. At 640 base station 105-*b* may transmit the mapped REGs to the at least one UE 115. At 645 UE 115-*b* may decode the at least one CCE based at least in part on the monitoring.

Figure 7:
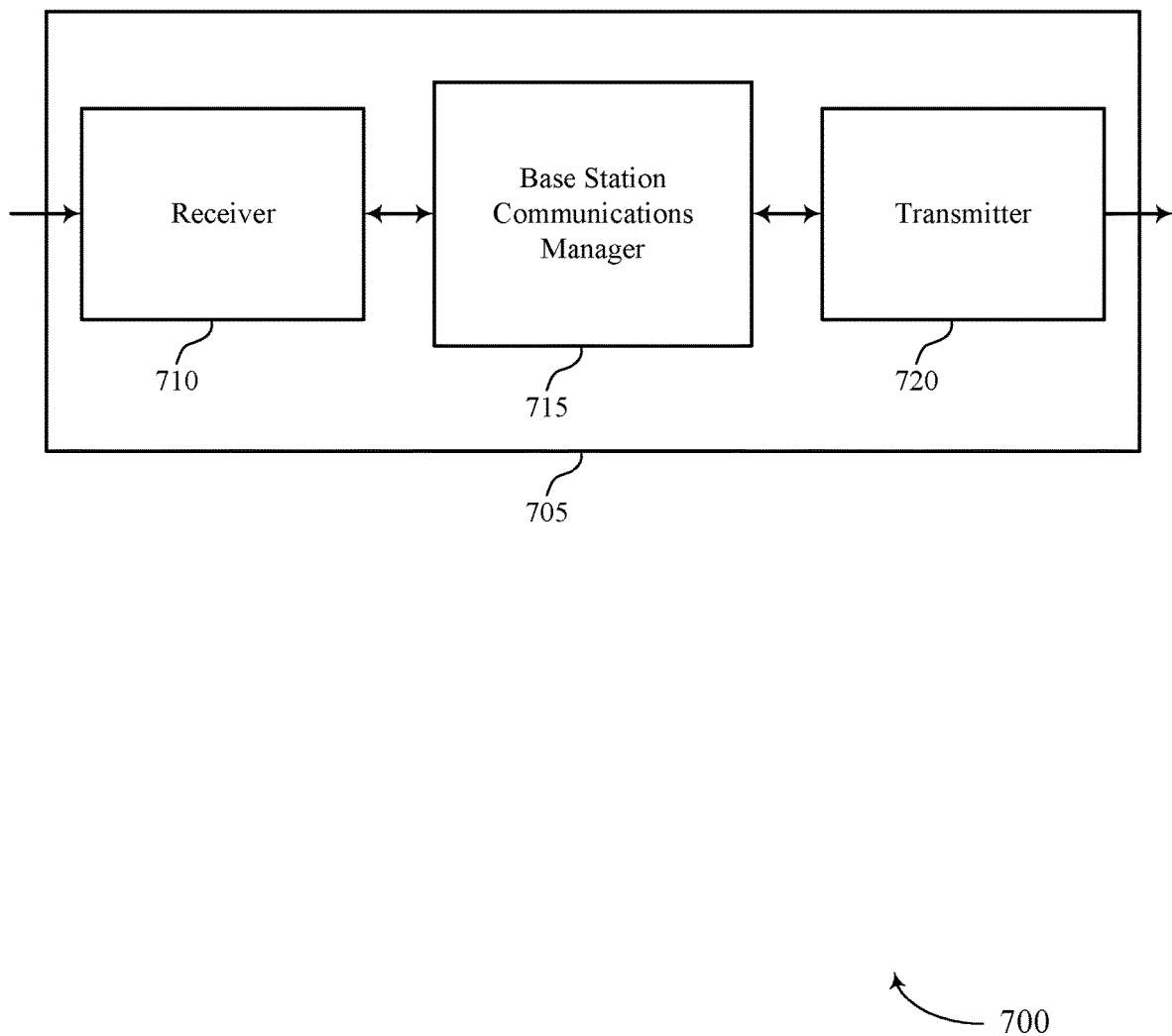
FIGS. 7 through 9 show block diagrams of a device that supports control element resource mapping schemes in accordance with aspects of the present disclosure.

FIG. 7 shows a block diagram 700 of a wireless device 705 that supports control element resource mapping schemes in accordance with aspects of the present disclosure. Wireless device 705 may be an example of aspects of a base station 105 as described herein. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to control element resource mapping schemes, etc.). Information may be passed on to other components of the device. The receiver 710 may be an example of aspects of the transceiver 1035 described with reference to FIG. 10. The receiver 710 may utilize a single antenna or a set of antennas.

Base station communications manager 715 may be an example of aspects of the base station communications manager 1015 described with reference to FIG. 10. Base station communications manager 715 and/or at least some of its various sub-components may be implemented in hardware, software executed by a processor, firmware, or any combination thereof. If implemented in software executed by a processor, the functions of the base station communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 715 and/or at least some of its various sub-components may be physically located at various positions, including being distributed such that portions of functions are implemented at different physical locations by one or more physical devices. In some examples, base station communications manager 715 and/or at least some of its various sub-components may be a separate and distinct component in accordance with various aspects of the present disclosure. In other examples, base station communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 715 may identify a resource set for transmission of a set of CCEs to at least one UE, where the resource set includes multiple REGs and multiple symbols. Base station communications manager 715 may determine a mapping scheme for mapping REGs of the resource set to CCEs of the set of CCEs based on a number of REGs in a symbol of the multiple symbols of the resource set. Base station communications manager 715 may map REGs to each CCE of the set of CCEs based on the mapping scheme and transmit the mapped REGs to the at least one UE.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
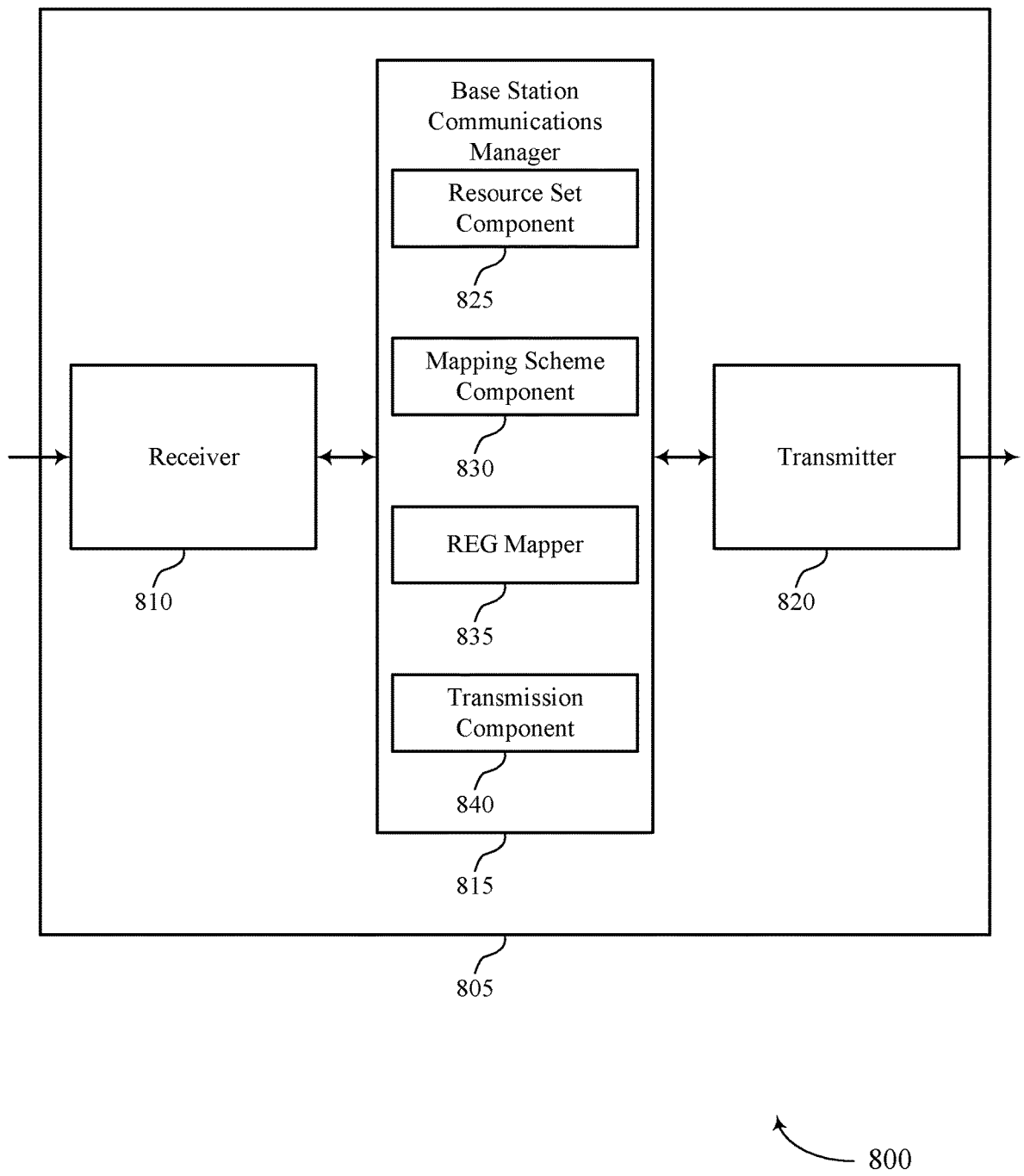

FIG. 8 shows a block diagram 800 of a wireless device 805 that supports control element resource mapping schemes in accordance with aspects of the present disclosure. Wireless device 805 may be an example of aspects of a wireless device 705 or a base station 105 as described with reference to FIG. 7. Wireless device 805 may include receiver 810, base station communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to control element resource mapping schemes, etc.). Information may be passed on to other components of the device. The receiver 810 may be an example of aspects of the transceiver 1035 described with reference to FIG. 10. The receiver 810 may utilize a single antenna or a set of antennas.

Base station communications manager 815 may be an example of aspects of the base station communications manager 1015 described with reference to FIG. 10. Base station communications manager 815 may also include resource set component 825, mapping scheme component 830, REG mapper 835, and transmission component 840.

Resource set component 825 may identify a resource set for transmission of a set of CCEs to at least one UE, where the resource set includes multiple REGs and multiple symbols. In some cases, the resource set includes an odd number of REGs in each symbol of multiple symbols of the resource set.

Mapping scheme component 830 may determine a mapping scheme for mapping REGs of the resource set to CCEs of the set of CCEs based on a number of REGs in a symbol of the multiple symbols of the resource set. In some cases, the mapping scheme includes one of a distributed mapping scheme or a localized mapping scheme.

REG mapper 835 may map REGs to each CCE of the set of CCEs based on the mapping scheme. In some cases, mapping REGs to each CCE includes: mapping a first set of REGs to a single CCE of the set of CCEs uniformly across two symbols of the multiple symbols of the resource set. In some examples, mapping REGs to each CCE includes: mapping REGs to a first subset of CCEs within a first symbol of the multiple symbols of the resource set and mapping REGs to a second subset of CCEs within a second symbol of the multiple symbols of the resource set. In some aspects, mapping REGs to each CCE includes: mapping respective REGs for respective CCEs within a same symbol of the multiple symbols of the resource set. In some instances, mapping REGs to each CCE includes: mapping REGs for a first CCE in a distributed pattern with respect to REGs for a second CCE within a same symbol of the resource set. In some cases, mapping REGs to each CCE includes: mapping each set of REGs for each CCE across the multiple symbols such that each set of REGs is mapped within a single symbol.

In some examples, the REGs are mapped to each CCE according to $nN_{SREG}^{SCCE}+1+j$, where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set. In some aspects, the REGs are mapped to each CCE according to $$N_{SREG}^{SCCE} \cdot \left(n \bmod \left\lfloor \frac{N_{RB}^{X_m}}{N_{SREG}^{SCCE}} \right\rfloor\right) + \left\lfloor \frac{n}{\left\lfloor \frac{N_{RB}^{X_m}}{N_{SREG}^{SCCE}} \right\rfloor} \right\rfloor \cdot (N_{RB}^{X_m} + N_{RB}^{X_m} \bmod N_{SREG}^{SCCE}) + j,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set. In some instances, the REGs are mapped to each CCE according to $$n\mathrm{mod}\left\lfloor\frac{N_{RB}^{X_m}}{N_{SREG}^{SCCE}}\right\rfloor + \left\lfloor\frac{n}{\left\lfloor\frac{N_{RB}^{X_m}}{N_{SREG}^{SCCE}}\right\rfloor}\right\rfloor \cdot \left(N_{RB}^{X_m} + N_{RB}^{X_m}\mathrm{mod}N_{SREG}^{SCCE}\right) + j\left\lfloor\frac{N_{RB}^{X_m}}{N_{SREG}^{SCCE}}\right\rfloor,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor\frac{N_{RB}^{X_m}}{N_{SREG}^{SCCE}}\right\rfloor - 1\right\},$$

n is a CCE index, Ns is a number of symbols in the resource set, and $N_{RB}^{X_m}$ is a number of REGs in each symbol of the resource set.

Transmission component 840 may transmit the mapped REGs to the at least one UE.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
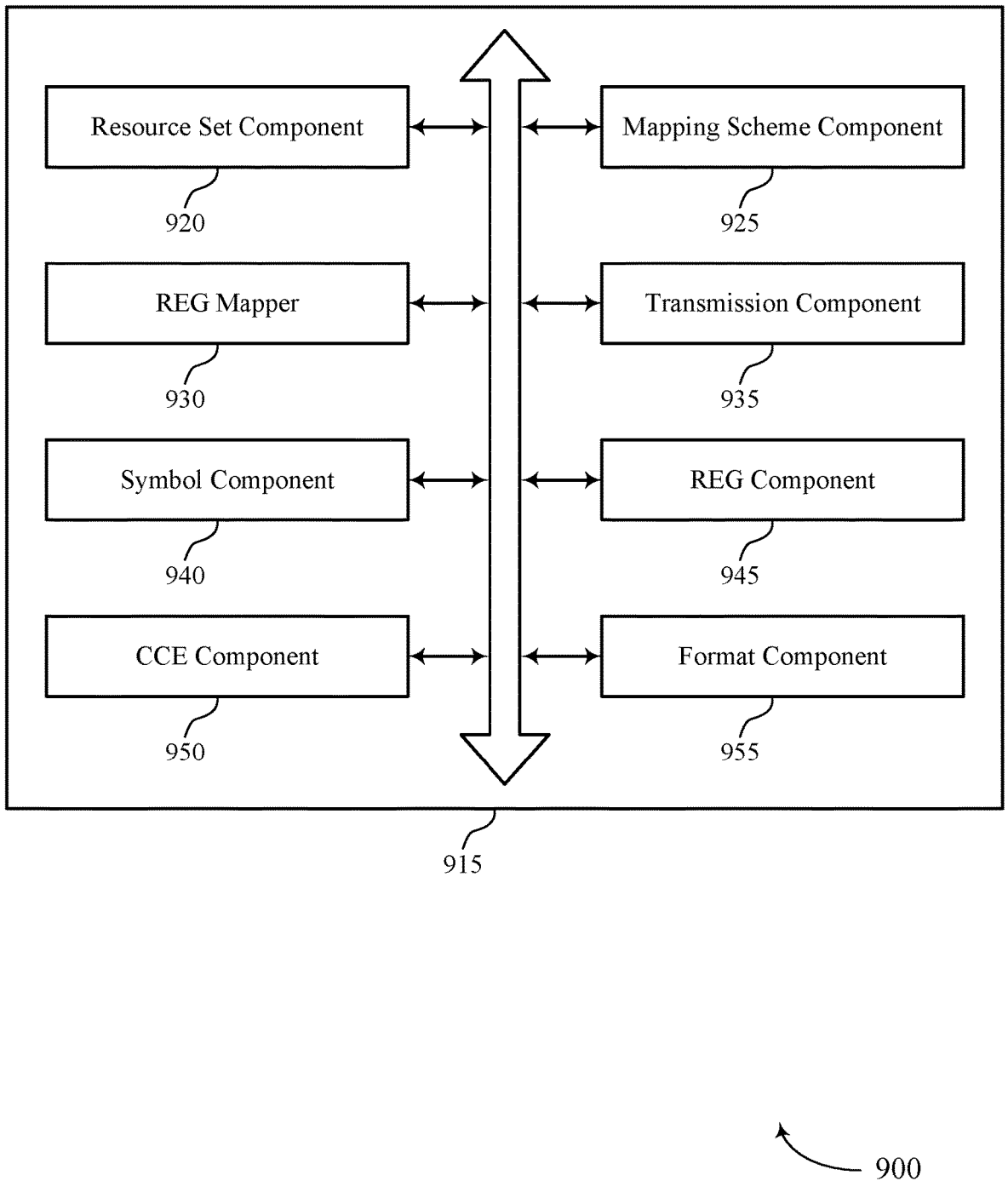

FIG. 9 shows a block diagram 900 of a base station communications manager 915 that supports control element resource mapping schemes in accordance with aspects of the present disclosure. The base station communications manager 915 may be an example of aspects of a base station communications manager 715, a base station communications manager 815, or a base station communications manager 1015 described with reference to FIGS. 7, 8, and 10. The base station communications manager 915 may include resource set component 920, mapping scheme component 925, REG mapper 930, transmission component 935, symbol component 940, REG component 945, CCE component 950, and format component 955. Each of these modules may communicate, directly or indirectly, with one another (e.g., via one or more buses).

Resource set component 920 may identify a resource set for transmission of a set of CCEs to at least one UE, where the resource set includes multiple REGs and multiple symbols. In some cases, the resource set includes an odd number of REGs in each symbol of multiple symbols of the resource set.

Mapping scheme component 925 may determine a mapping scheme for mapping REGs of the resource set to CCEs of the set of CCEs based on a number of REGs in a symbol of the multiple symbols of the resource set. In some cases, the mapping scheme includes one of a distributed mapping scheme or a localized mapping scheme.

REG mapper 930 may map REGs to each CCE of the set of CCEs based on the mapping scheme. In some cases, mapping REGs to each CCE includes: mapping a first set of REGs to a single CCE of the set of CCEs uniformly across two symbols of the multiple symbols of the resource set. In some examples, mapping REGs to each CCE includes: mapping REGs to a first subset of CCEs within a first symbol of the multiple symbols of the resource set and mapping REGs to a second subset of CCEs within a second symbol of the multiple symbols of the resource set. In some instances, mapping REGs to each CCE includes: mapping respective REGs for respective CCEs within a same symbol of the multiple symbols of the resource set. In some aspects, mapping REGs to each CCE includes: mapping REGs for a first CCE in a distributed pattern with respect to REGs for a second CCE within a same symbol of the resource set. In some cases, mapping REGs to each CCE includes: mapping each set of REGs for each CCE across the multiple symbols such that each set of REGs is mapped within a single symbol.

In some examples, the REGs are mapped to each CCE according to $nN_{SREG}^{SCCE}+1+j$, where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor\frac{N_{RB}^{X_m}}{N_{SREG}^{SCCE}}\right\rfloor - 1\right\},$$

n is a CCE index, Ns is a number of symbols in the resource set, and $N_{RB}^{X_m}$ is a number of REGs in each symbol of the resource set. In some instances, the REGs are mapped to each CCE according to $$N_{SREG}^{SCCE} \cdot \left(n\mathrm{mod}\left\lfloor\frac{N_{RB}^{X_m}}{N_{SREG}^{SCCE}}\right\rfloor\right) + \left\lfloor\frac{n}{\left\lfloor\frac{N_{RB}^{X_m}}{N_{SREG}^{SCCE}}\right\rfloor}\right\rfloor \cdot \left(N_{RB}^{X_m} + N_{RB}^{X_m}\mathrm{mod}N_{SREG}^{SCCE}\right) + j,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor\frac{N_{RB}^{X_m}}{N_{SREG}^{SCCE}}\right\rfloor - 1\right\},$$

n is a CCE index, Ns is a number of symbols in the resource set, and $N_{RB}^{X_m}$ is a number of REGs in each symbol of the resource set. In some aspects, the REGs are mapped to each CCE according to $$n\mathrm{mod}\left\lfloor\frac{N_{RB}^{X_m}}{N_{SREG}^{SCCE}}\right\rfloor + \left\lfloor\frac{n}{\left\lfloor\frac{N_{RB}^{X_m}}{N_{SREG}^{SCCE}}\right\rfloor}\right\rfloor \cdot \left(N_{RB}^{X_m} + N_{RB}^{X_m}\mathrm{mod}N_{SREG}^{SCCE}\right) + j\left\lfloor\frac{N_{RB}^{X_m}}{N_{SREG}^{SCCE}}\right\rfloor,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor\frac{N_{RB}^{X_m}}{N_{SREG}^{SCCE}}\right\rfloor - 1\right\},$$

n is a CCE index, Ns is a number of symbols in the resource set, and $N_{RB}^{X_m}$ is a number of REGs in each symbol of the resource set.

Transmission component 935 may transmit the mapped REGs to the at least one UE. Symbol component 940 may determine the mapping scheme based on a number of symbols of the resource set. REG component 945 may determine the mapping scheme based on a number of REGs in each CCE of the set of CCEs. CCE component 950 may determine the mapping scheme based on a number of CCEs in the set of CCEs.

Format component 955 may transmit a resource set configuration to the at least one UE, where the mapping scheme is determined based on the resource set configuration. In some cases, the resource set configuration is transmitted via RRC signaling.

Figure 10:
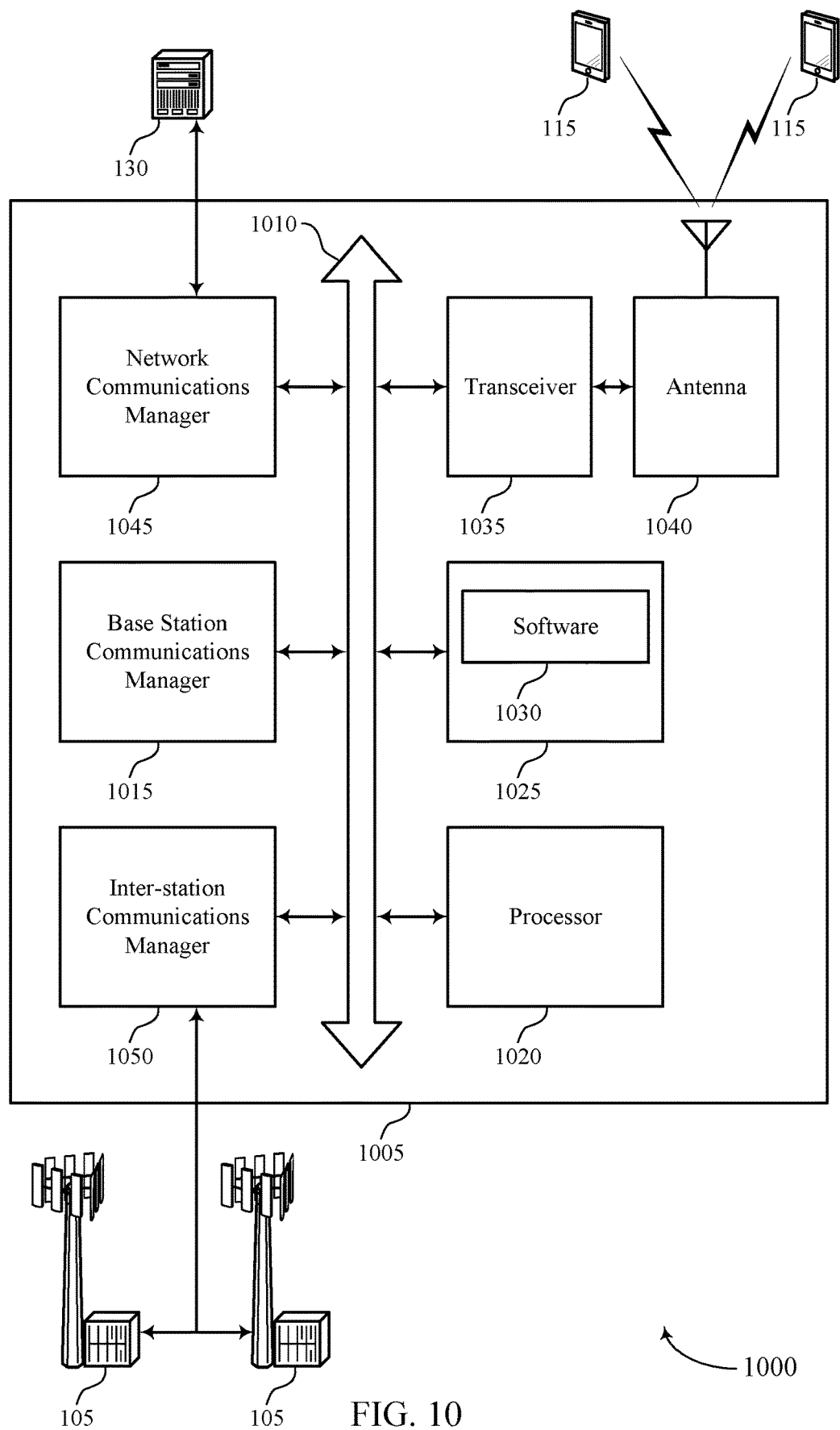
FIG. 10 illustrates a block diagram of a system including a base station that supports control element resource mapping schemes in accordance with aspects of the present disclosure.

FIG. 10 shows a diagram of a system 1000 including a device 1005 that supports control element resource mapping schemes in accordance with aspects of the present disclosure. Device 1005 may be an example of or include the components of wireless device 705, wireless device 805, or a base station 105 as described above, e.g., with reference to FIGS. 7 and 8. Device 1005 may include components for bi-directional voice and data communications including components for transmitting and receiving communications, including base station communications manager 1015, processor 1020, memory 1025, software 1030, transceiver 1035, antenna 1040, network communications manager 1045, and inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting control element resource mapping schemes).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support control element resource mapping schemes. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
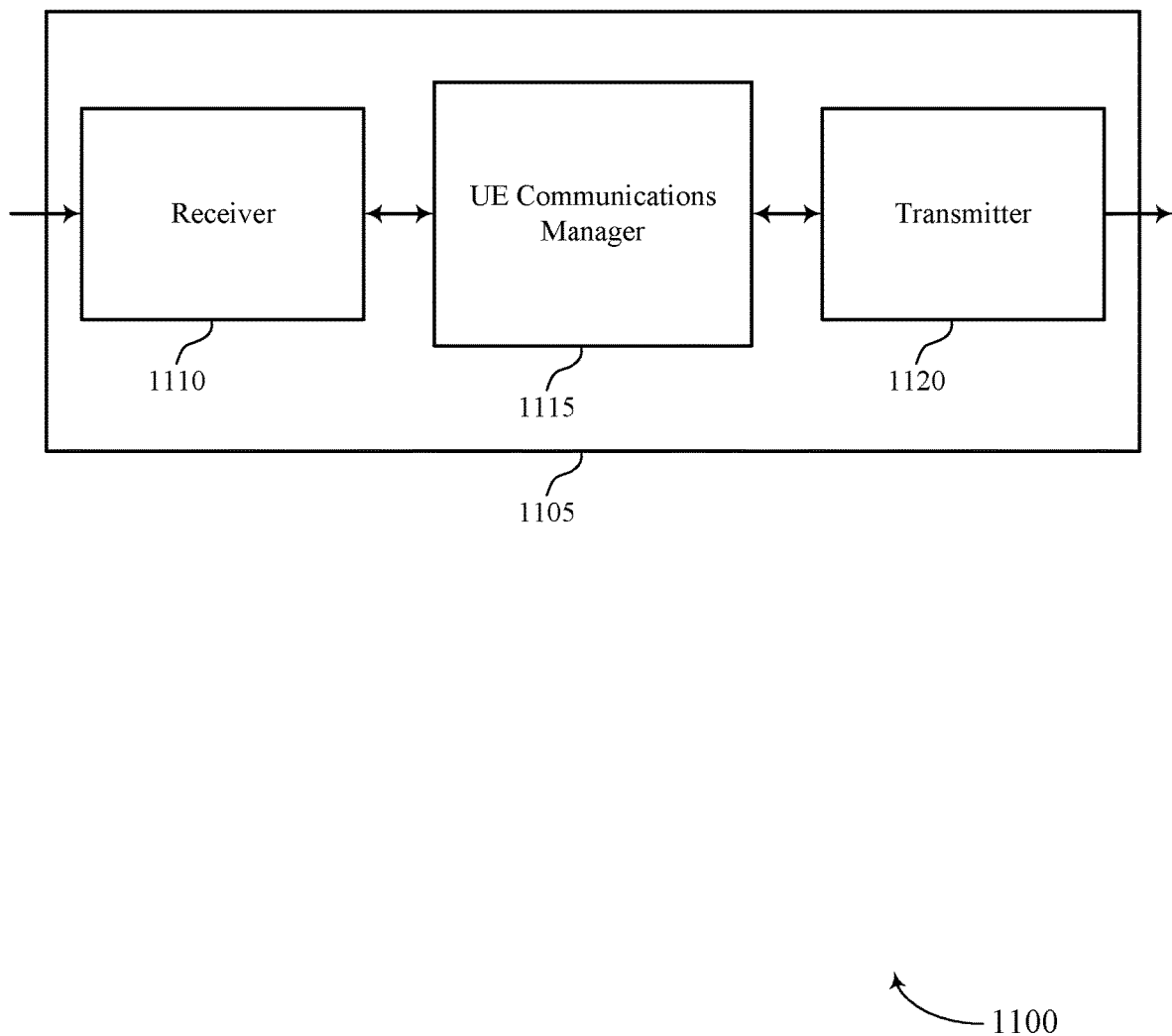
FIGS. 11 through 13 show block diagrams of a device that supports control element resource mapping schemes in accordance with aspects of the present disclosure.

FIG. 11 shows a block diagram 1100 of a wireless device 1105 that supports control element resource mapping schemes in accordance with aspects of the present disclosure. Wireless device 1105 may be an example of aspects of a UE 115 as described herein. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to control element resource mapping schemes, etc.). Information may be passed on to other components of the device. The receiver 1110 may be an example of aspects of the transceiver 1435 described with reference to FIG. 14. The receiver 1110 may utilize a single antenna or a set of antennas.

UE communications manager 1115 may be an example of aspects of the UE communications manager 1415 described with reference to FIG. 14. UE communications manager 1115 and/or at least some of its various sub-components may be implemented in hardware, software executed by a processor, firmware, or any combination thereof. If implemented in software executed by a processor, the functions of the UE communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 1115 and/or at least some of its various sub-components may be physically located at various positions, including being distributed such that portions of functions are implemented at different physical locations by one or more physical devices. In some examples, UE communications manager 1115 and/or at least some of its various sub-components may be a separate and distinct component in accordance with various aspects of the present disclosure. In other examples, UE communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1115 may receive, from a base station, a resource set configuration that identifies a resource set for one or more CCEs, where the resource set includes multiple REGs and multiple symbols. UE communications manager 1115 may determine a mapping scheme for mapping REGs of the resource set to the one or more CCEs based on the resource set configuration and a number of REGs in a symbol of the multiple symbols of the resource set. UE communications manager 1115 may monitor the resource set for at least one of the one or more CCEs based on the mapping scheme and decode the at least one CCE based on the monitoring.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
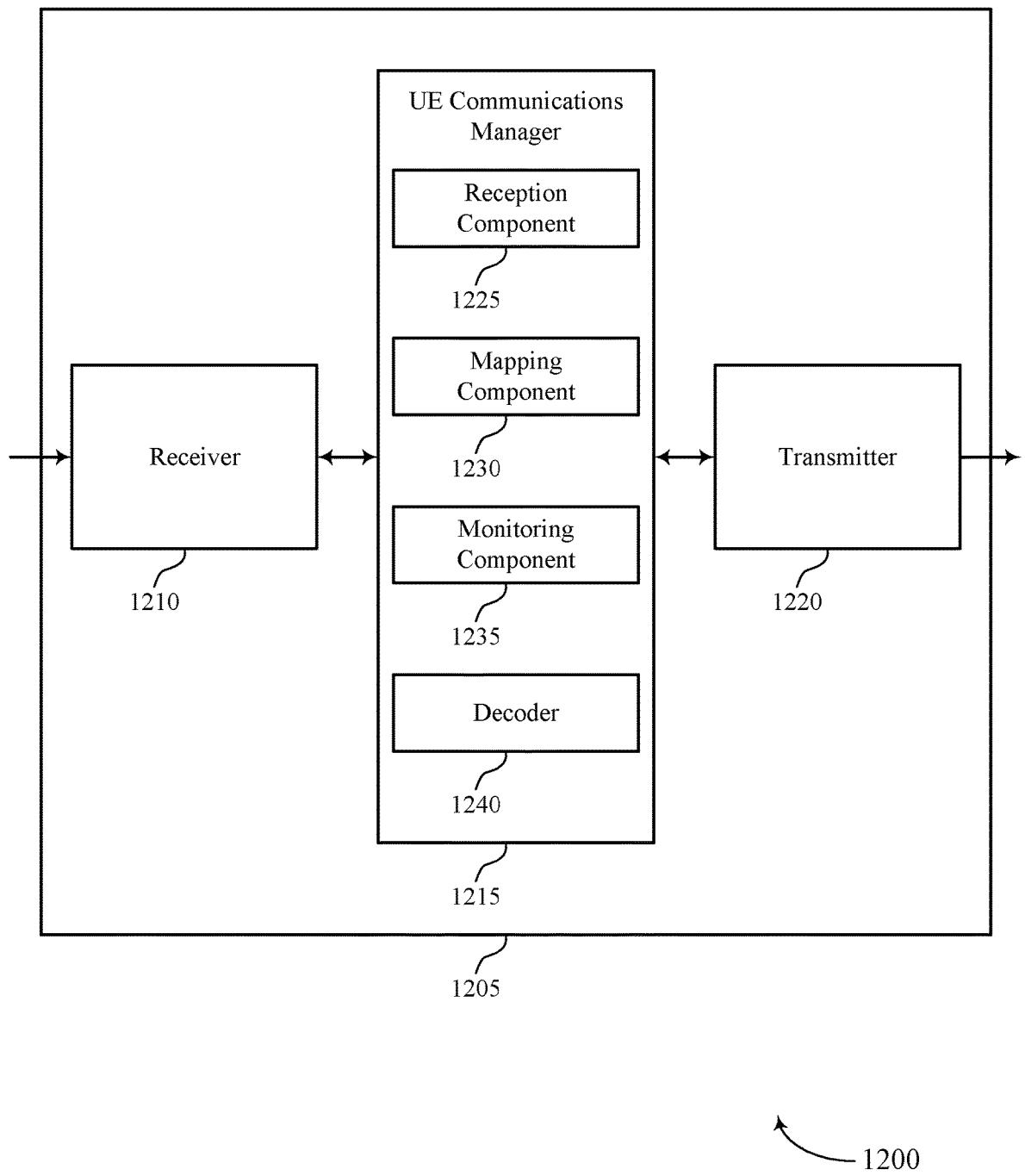

FIG. 12 shows a block diagram 1200 of a wireless device 1205 that supports control element resource mapping schemes in accordance with aspects of the present disclosure. Wireless device 1205 may be an example of aspects of a wireless device 1105 or a UE 115 as described with reference to FIG. 11. Wireless device 1205 may include receiver 1210, UE communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to control element resource mapping schemes, etc.). Information may be passed on to other components of the device. The receiver 1210 may be an example of aspects of the transceiver 1435 described with reference to FIG. 14. The receiver 1210 may utilize a single antenna or a set of antennas.

UE communications manager 1215 may be an example of aspects of the UE communications manager 1415 described with reference to FIG. 14. UE communications manager 1215 may also include reception component 1225, mapping component 1230, monitoring component 1235, and decoder 1240.

Reception component 1225 may receive, from a base station, a resource set configuration that identifies a resource set for one or more CCEs, where the resource set includes multiple REGs and multiple symbols. In some cases, the resource set configuration is received via RRC signaling. In some examples, the resource set includes an odd number of REGs in each symbol of multiple symbols of the resource set.

Mapping component 1230 may determine a mapping scheme for mapping REGs of the resource set to the one or more CCEs based on the resource set configuration and a number of REGs in a symbol of the multiple symbols of the resource set. In some cases, a first set of REGs is mapped to a first CCE of the one or more CCEs uniformly across two symbols of the multiple symbols of the resource set according to the mapping scheme. In some examples, respective REGs are mapped to respective CCEs within a same symbol of the multiple symbols of the resource set according to the mapping scheme. In some instances, respective REGs are mapped to a first CCE in distributed pattern with respect to REGs mapped to a second CCE within a same symbol of the resource set according to the mapping scheme. In some aspects, REGs are mapped to a first subset of CCEs within a first symbol of the multiple symbols of the resource set and REGs are mapped to a second subset of CCEs within a second symbol of the multiple symbols of the resource set. In some cases, each set of REGs are mapped to each CCE across the multiple symbols such that each set of REGs is within a single symbol. In some examples, the mapping scheme includes one of a distributed mapping scheme or a localized mapping scheme.

In some aspects, the REGs are mapped to each CCE according to $nN_{SREG}^{SCCE}+1+j$, where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set. In some instances, the REGs are mapped to each CCE according to $$N_{SREG}^{SCCE} \cdot \left(n \bmod \left\lfloor \frac{N_{RB}^{X_m}}{N_{SREG}^{SCCE}} \right\rfloor\right) + \left\lfloor \frac{n}{\left\lfloor \frac{N_{RB}^{X_m}}{N_{SREG}^{SCCE}} \right\rfloor} \right\rfloor \cdot \left(N_{RB}^{X_m} + N_{RB}^{X_m} \bmod N_{SREG}^{SCCE}\right) + j,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set. In some cases, the REGs are mapped to each CCE according to $$n \bmod \left\lfloor \frac{N_{RB}^{X_m}}{N_{SREG}^{SCCE}} \right\rfloor + \left\lfloor \frac{n}{\left\lfloor \frac{N_{RB}^{X_m}}{N_{SREG}^{SCCE}} \right\rfloor} \right\rfloor \cdot \left(N_{RB}^{X_m} + N_{RB}^{X_m} \bmod N_{SREG}^{SCCE}\right) + j \left\lfloor \frac{N_{RB}^{X_m}}{N_{SREG}^{SCCE}} \right\rfloor,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

Monitoring component 1235 may monitor the resource set for at least one of the one or more CCEs based on the mapping scheme. Decoder 1240 may decode the at least one CCE based on the monitoring.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
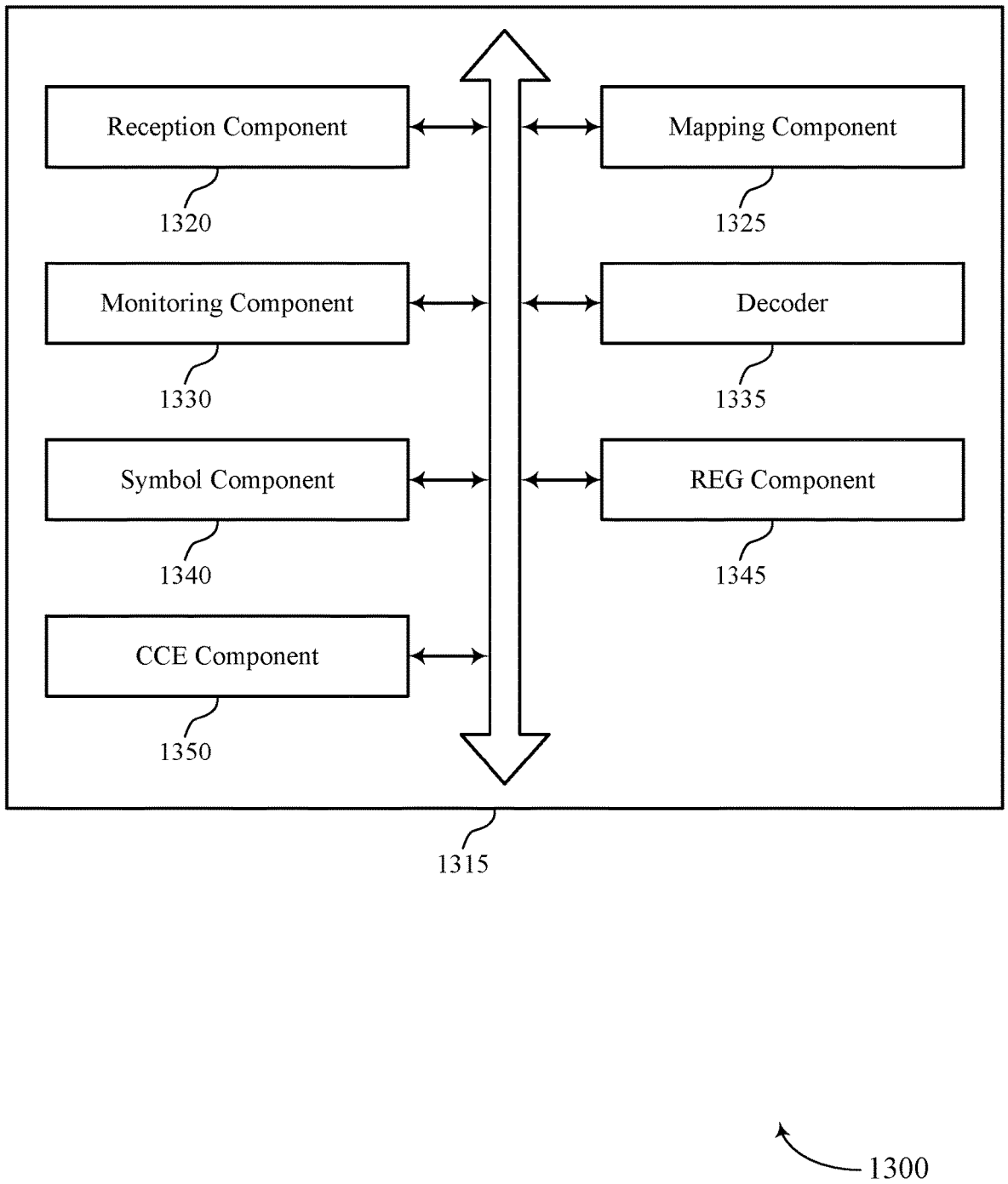

FIG. 13 shows a block diagram 1300 of a UE communications manager 1315 that supports control element resource mapping schemes in accordance with aspects of the present disclosure. The UE communications manager 1315 may be an example of aspects of a UE communications manager 1415 described with reference to FIGS. 11, 12, and 14. The UE communications manager 1315 may include reception component 1320, mapping component 1325, monitoring component 1330, decoder 1335, symbol component 1340, REG component 1345, and CCE component 1350. Each of these modules may communicate, directly or indirectly, with one another (e.g., via one or more buses).

Reception component 1320 may receive, from a base station, a resource set configuration that identifies a resource set for one or more CCEs, where the resource set includes multiple REGs and multiple symbols. In some cases, the resource set configuration is received via RRC signaling. In some examples, the resource set includes an odd number of REGs in each symbol of multiple symbols of the resource set.

Mapping component 1325 may determine a mapping scheme for mapping REGs of the resource set to the one or more CCEs based on the resource set configuration and a number of REGs in a symbol of the multiple symbols of the resource set. In some cases, a first set of REGs is mapped to a first CCE of the one or more CCEs uniformly across two symbols of the multiple symbols of the resource set according to the mapping scheme. In some examples, respective REGs are mapped to respective CCEs within a same symbol of the multiple symbols of the resource set according to the mapping scheme. In some aspects, respective REGs are mapped to a first CCE in distributed pattern with respect to REGs mapped to a second CCE within a same symbol of the resource set according to the mapping scheme. In some instances, REGs are mapped to a first subset of CCEs within a first symbol of the multiple symbols of the resource set and REGs are mapped to a second subset of CCEs within a second symbol of the multiple symbols of the resource set. In some cases, each set of REGs are mapped to each CCE across the multiple symbols such that each set of REGs is within a single symbol. In some examples, the mapping scheme includes one of a distributed mapping scheme or a localized mapping scheme.

In some aspects, the REGs are mapped to each CCE according to $nN_{SREG}^{SCCE}+1+j$, where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set. In some instances, the REGs are mapped to each CCE according to $$N_{SREG}^{SCCE} \cdot \left(n \bmod \left\lfloor \frac{N_{RB}^{X_m}}{N_{SREG}^{SCCE}} \right\rfloor\right) + \left\lfloor \frac{n}{\left\lfloor \frac{N_{RB}^{X_m}}{N_{SREG}^{SCCE}} \right\rfloor} \right\rfloor \cdot \left(N_{RB}^{X_m} + N_{RB}^{X_m} \bmod N_{SREG}^{SCCE}\right) + j,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set. In some cases, the REGs are mapped to each CCE according to n mod $$\left\lfloor \frac{N_{RB}^{X_m}}{N_{SREG}^{SCCE}} \right\rfloor + \left\lfloor \frac{n}{\left\lfloor \frac{N_{RB}^{X_m}}{N_{SREG}^{SCCE}} \right\rfloor} \right\rfloor \cdot \left(N_{RB}^{X_m} + N_{RB}^{X_m} \bmod N_{SREG}^{SCCE}\right) + j \left\lfloor \frac{N_{RB}^{X_m}}{N_{SREG}^{SCCE}} \right\rfloor,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

Monitoring component 1330 may monitor the resource set for at least one of the one or more CCEs based on the mapping scheme. Decoder 1335 may decode the at least one CCE based on the monitoring. Symbol component 1340 may determine the mapping scheme based on a number of symbols of the resource set. REG component 1345 may determine the mapping scheme based on a number of REGs in each CCE of the one or more CCEs. CCE component 1350 may determine the mapping scheme based on a number of CCEs in the one or more CCEs.

Figure 14:
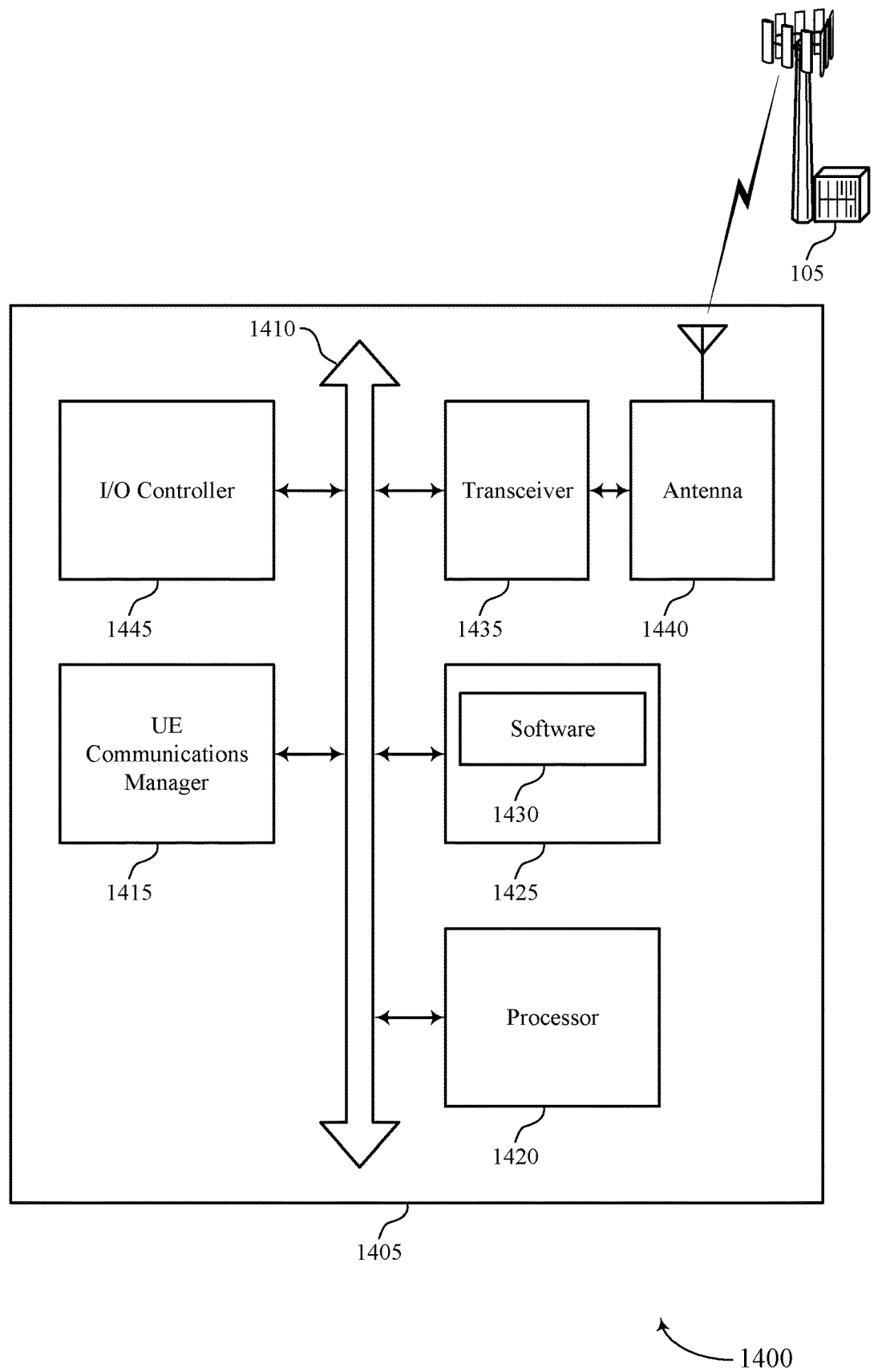
FIG. 14 illustrates a block diagram of a system including a user equipment (UE) that supports control element resource mapping schemes in accordance with aspects of the present disclosure.

FIG. 14 shows a diagram of a system 1400 including a device 1405 that supports control element resource mapping schemes in accordance with aspects of the present disclosure. Device 1405 may be an example of or include the components of UE 115 as described above, e.g., with reference to FIG. 1. Device 1405 may include components for bi-directional voice and data communications including components for transmitting and receiving communications, including UE communications manager 1415, processor 1420, memory 1425, software 1430, transceiver 1435, antenna 1440, and I/O controller 1445. These components may be in electronic communication via one or more buses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting control element resource mapping schemes).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support control element resource mapping schemes. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
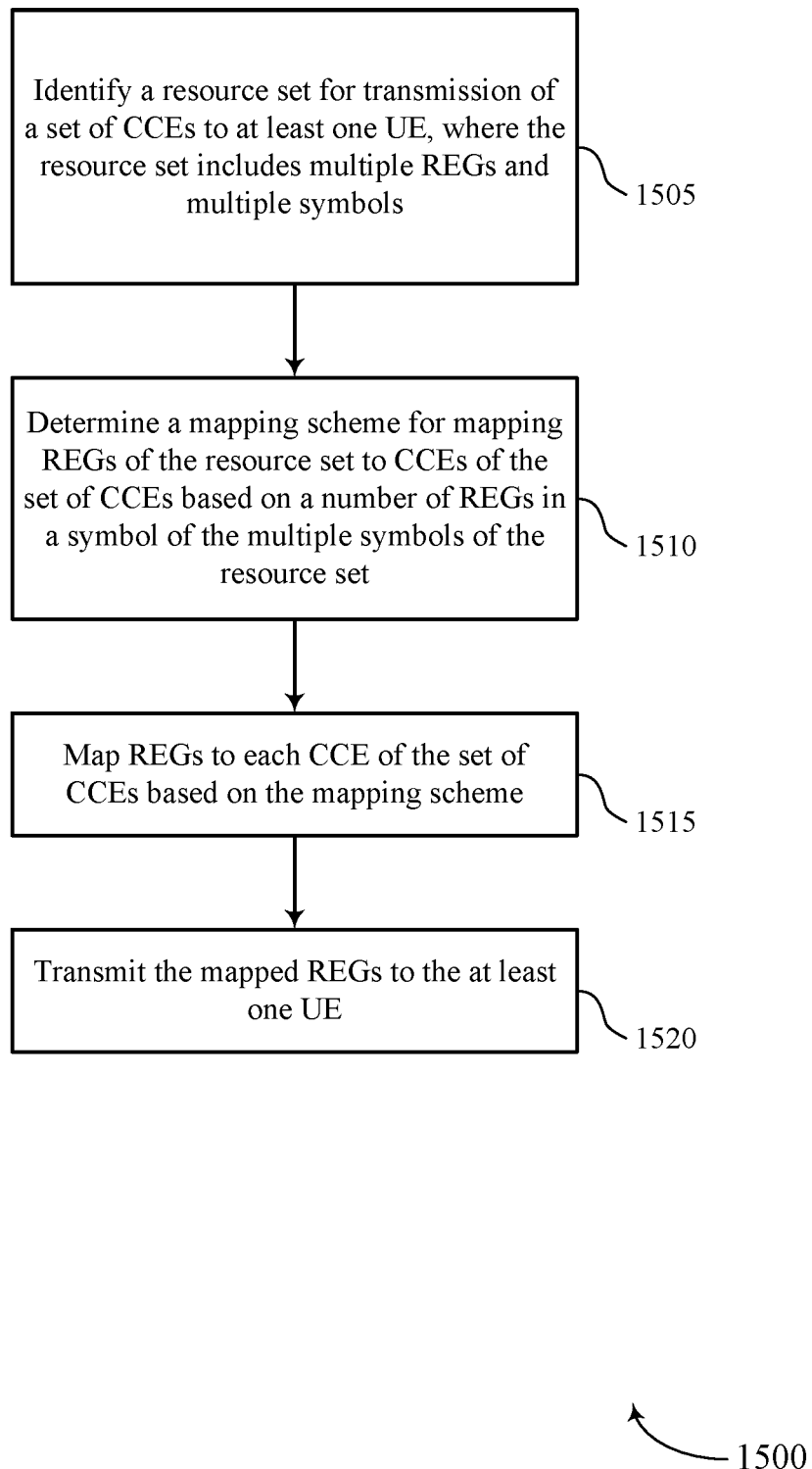
FIGS. 15 and 16 illustrate methods for control element resource mapping schemes in accordance with aspects of the present disclosure.

FIG. 15 shows a flowchart illustrating a method 1500 for control element resource mapping schemes in accordance with aspects of the present disclosure. The operations of method 1500 may be implemented by a base station 105 or its components as described herein. For example, the operations of method 1500 may be performed by a base station communications manager as described with reference to FIGS. 7 through 10. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may identify a resource set for transmission of a set of CCEs to at least one UE, wherein the resource set comprises multiple REGs and multiple symbols. The operations of 1505 may be performed according to the methods described herein. In certain examples, aspects of the operations of 1505 may be performed by a resource set component as described with reference to FIGS. 7 through 10.

At 1510 the base station 105 may determine a mapping scheme for mapping REGs of the resource set to CCEs of the set of CCEs based at least in part on a number of REGs in a symbol of the multiple symbols of the resource set. The operations of 1510 may be performed according to the methods described herein. In certain examples, aspects of the operations of 1510 may be performed by a mapping scheme component as described with reference to FIGS. 7 through 10.

At 1515 the base station 105 may map REGs to each CCE of the set of CCEs based at least in part on the mapping scheme. The operations of 1515 may be performed according to the methods described herein. In certain examples, aspects of the operations of 1515 may be performed by a REG mapper as described with reference to FIGS. 7 through 10.

At 1520 the base station 105 may transmit the mapped REGs to the at least one UE. The operations of 1520 may be performed according to the methods described herein. In certain examples, aspects of the operations of 1520 may be performed by a transmission component as described with reference to FIGS. 7 through 10.

Figure 16:
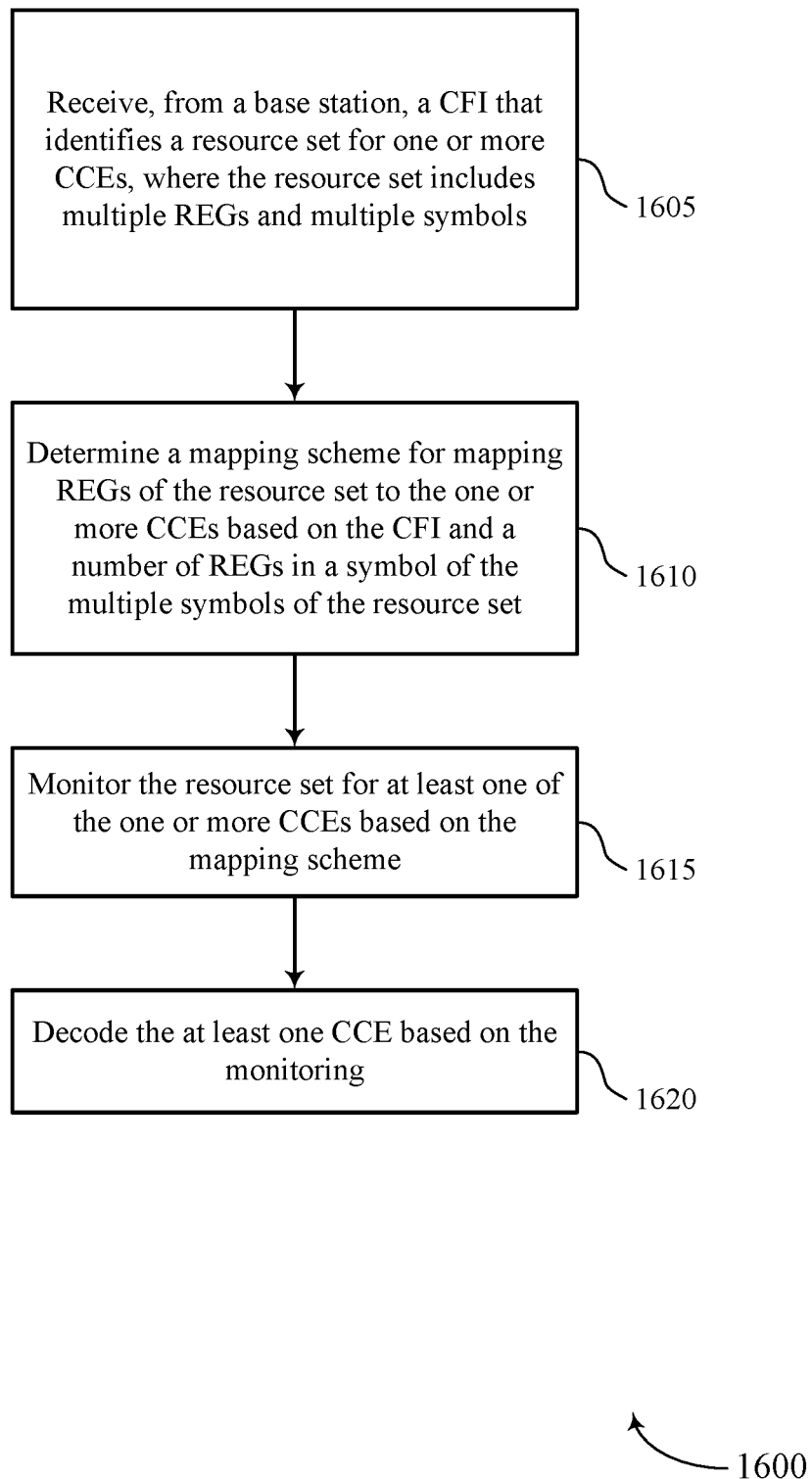

FIG. 16 shows a flowchart illustrating a method 1600 for control element resource mapping schemes in accordance with aspects of the present disclosure. The operations of method 1600 may be implemented by a UE 115 or its components as described herein. For example, the operations of method 1600 may be performed by a UE communications manager as described with reference to FIGS. 11 through 14. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive, from a base station, a resource set configuration that identifies a resource set for one or more CCEs, wherein the resource set comprises multiple REGs and multiple symbols. The operations of 1605 may be performed according to the methods described herein. In certain examples, aspects of the operations of 1605 may be performed by a reception component as described with reference to FIGS. 11 through 14.

At 1610 the UE 115 may determine a mapping scheme for mapping REGs of the resource set to the one or more CCEs based at least in part on the resource set configuration and a number of REGs in a symbol of the multiple symbols of the resource set. The operations of 1610 may be performed according to the methods described herein. In certain examples, aspects of the operations of 1610 may be performed by a mapping component as described with reference to FIGS. 11 through 14.

At 1615 the UE 115 may monitor the resource set for at least one of the one or more CCEs based at least in part on the mapping scheme. The operations of 1615 may be performed according to the methods described herein. In certain examples, aspects of the operations of 1615 may be performed by a monitoring component as described with reference to FIGS. 11 through 14.

At 1620 the UE 115 may decode the at least one CCE based at least in part on the monitoring. The operations of 1620 may be performed according to the methods described herein. In certain examples, aspects of the operations of 1620 may be performed by a decoder as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying a resource set for transmission of a set of control channel elements (CCEs) to at least one user equipment (UE), wherein the resource set comprises multiple resource element groups (REGs) associated with respective CCEs and multiple symbols, wherein a REG of the multiple REGs spans, in the time domain, a respective single symbol of the multiple symbols;
   determining a mapping scheme for mapping REGs of the resource set to CCEs of the set of CCEs based at least in part on a number of REGs in a respective symbol of the multiple symbols of the resource set and whether the number of REGs in the respective symbol is an odd number, wherein the number of REGs in the respective symbol is greater than a number of REGs in a CCE within the respective symbol of the set of CCEs;
   mapping REGs to each CCE of the set of CCEs based at least in part on the mapping scheme; and
   transmitting the mapped REGs to the at least one UE.

2. The method of claim 1, further comprising:
   determining the mapping scheme based at least in part on a number of symbols of the resource set.

3. The method of claim 1, further comprising:
   determining the mapping scheme based at least in part on the number of REGs in each CCE of the set of CCEs.

4. The method of claim 1, further comprising:
   determining the mapping scheme based at least in part on a number of CCEs in the set of CCEs.

5. The method of claim 1, further comprising:
   transmitting a resource set configuration to the at least one UE, wherein the mapping scheme is determined based at least in part on the resource set configuration.

6. The method of claim 5, wherein the resource set configuration is transmitted via radio resource control (RRC) signaling.

7. The method of claim 1, wherein mapping REGs to each CCE comprises:
   mapping a first set of REGs to a single CCE of the set of CCEs uniformly across two symbols of the multiple symbols of the resource set.

8. The method of claim 1, wherein mapping REGs to each CCE comprises:
   mapping REGs to a first subset of CCEs within a first symbol of the multiple symbols of the resource set and mapping REGs to a second subset of CCEs within a second symbol of the multiple symbols of the resource set.

9. The method of claim 1, wherein mapping REGs to each CCE comprises:
   mapping respective REGs for respective CCEs within a same symbol of the multiple symbols of the resource set.

10. The method of claim 1, wherein mapping REGs to each CCE comprises:
    mapping REGs for a first CCE in a distributed pattern with respect to REGs for a second CCE within a same symbol of the resource set.

11. The method of claim 1, wherein mapping REGs to each CCE comprises:
    mapping each set of REGs for each CCE of the set of CCEs across the multiple symbols such that each set of REGs is mapped within a single symbol.

12. The method of claim 1, wherein the mapping scheme comprises one of a distributed mapping scheme or a localized mapping scheme.

13. The method of claim 1, wherein:
    the resource set comprises an odd number of REGs in each symbol of multiple symbols of the resource set; and
    the REGs are mapped to each CCE according to $nN_{SREG}^{SCCE}+1+j$, where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

14. The method of claim 1, wherein the REGs are mapped to each CCE according to $$N_{SREG}^{SCCE} \cdot \left(n \bmod \left\lfloor \frac{N_{RB}^{X_m}}{N_{SREG}^{SCCE}} \right\rfloor\right) + \left\lfloor \frac{n}{\left\lfloor \frac{N_{RB}^{X_m}}{N_{SREG}^{SCCE}} \right\rfloor} \right\rfloor \cdot \left(N_{RB}^{X_m} + N_{RB}^{X_m} \bmod N_{SREG}^{SCCE}\right) + j,$$

where $N_{SREG}^{SCCE}$ is a number of REGs per CCE, $j \in \{0, \ldots, N_{SREG}^{SCCE}-1\}$, $$n \in \left\{0, \ldots, Ns * \left\lfloor \frac{N_{RB}^{X_m}}{N_{SREG}^{SCCE}} \right\rfloor - 1\right\},$$

n is a CCE index, Ns is a number of symbols in the resource set, and $N_{RB}^{X_m}$ is a number of REGs in each symbol of the resource set.

15. The method of claim 1, wherein the REGs are mapped to each CCE according to $$n \bmod \left\lfloor \frac{N_{RB}^{X_m}}{N_{SREG}^{SCCE}} \right\rfloor + \left\lfloor \frac{n}{\left\lfloor \frac{N_{RB}^{X_m}}{N_{SREG}^{SCCE}} \right\rfloor} \right\rfloor \cdot \left( N_{RB}^{X_m} + N_{RB}^{X_m} \bmod N_{SREG}^{SCCE} \right) + j \left\lfloor \frac{N_{RB}^{X_m}}{N_{SREG}^{SCCE}} \right\rfloor,$$

where $N_{SREG}^{SCCE}$ is a number of REGs per CCE, $j \in \{0, \ldots, N_{SREG}^{SCCE} - 1\}$, $$n \in \left\{ 0, \ldots, Ns * \left\lfloor \frac{N_{RB}^{X_m}}{N_{SREG}^{SCCE}} \right\rfloor - 1 \right\},$$

n is a CCE index, Ns is a number of symbols in the resource set, and $N_{RB}^{X_m}$ is a number of REGs in each symbol of the resource set.

16. A method for wireless communications, comprising:
receiving, from a network device, a resource set configuration that identifies a resource set for one or more control channel elements (CCEs), wherein the resource set comprises multiple resource element groups (REGs) associated with respective CCEs and multiple symbols wherein a REG of the multiple REGs spans, in the time domain, a respective single symbol of the multiple symbols;
determining a mapping scheme for mapping REGs of the resource set to the one or more CCEs based at least in part on the resource set configuration and a number of REGs in a respective symbol of the multiple symbols of the resource set, including whether the number of REGs in the respective symbol of the multiple symbols of the resource set is an odd number, wherein the number of REGs in the respective symbol is greater than a number of REGs in a CCE within the respective symbol of the one or more CCEs;
monitoring the resource set for at least one of the one or more CCEs based at least in part on the mapping scheme; and
decoding the at least one CCE based at least in part on the monitoring.

17. The method of claim 16, further comprising:
determining the mapping scheme based at least in part on a number of symbols of the resource set.

18. The method of claim 16, further comprising:
determining the mapping scheme based at least in part on the number of REGs in each CCE of the one or more CCEs.

19. The method of claim 16, further comprising:
determining the mapping scheme based at least in part on a number of CCEs in the one or more CCEs.

20. The method of claim 16, wherein the resource set configuration is received via radio resource control (RRC) signaling.

21. The method of claim 16, wherein a first set of REGs is mapped to a first CCE of the one or more CCEs uniformly across two symbols of the multiple symbols of the resource set according to the mapping scheme.

22. The method of claim 16, wherein respective REGs are mapped to respective CCEs within a same symbol of the multiple symbols of the resource set according to the mapping scheme.

23. The method of claim 16, wherein respective REGs are mapped to a first CCE in distributed pattern with respect to REGs mapped to a second CCE within a same symbol of the resource set according to the mapping scheme.

24. The method of claim 16, wherein REGs are mapped to a first subset of CCEs within a first symbol of the multiple symbols of the resource set and REGs are mapped to a second subset of CCEs within a second symbol of the multiple symbols of the resource set.

25. The method of claim 16, wherein each set of REGs are mapped to each CCE of the set of CCEs across the multiple symbols such that each set of REGs is within a single symbol.

26. The method of claim 16, wherein the mapping scheme comprises one of a distributed mapping scheme or a localized mapping scheme.

27. The method of claim 16, wherein:
the resource set comprises an odd number of REGs in each symbol of multiple symbols of the resource set; and
the REGs are mapped to each CCE according to $nN_{SREG}^{SCCE} + 1 + j$, where $N_{SREG}^{SCCE}$ is a number of REGs per CCE, $j \in \{0, \ldots, N_{SREG}^{SCCE} - 1\}$, $$n \in \left\{ 0, \ldots, Ns * \left\lfloor \frac{N_{RB}^{X_m}}{N_{SREG}^{SCCE}} \right\rfloor - 1 \right\},$$

n is a CCE index, Ns is a number of symbols in the resource set, and $N_{RB}^{X_m}$ is a number of REGs in each symbol of the resource set.

28. The method of claim 16, wherein the REGs are mapped to each CCE according to $$N_{SREG}^{SCCE} \cdot \left( n \bmod \left\lfloor \frac{N_{RB}^{X_m}}{N_{SREG}^{SCCE}} \right\rfloor \right) + \left\lfloor \frac{n}{\left\lfloor \frac{N_{RB}^{X_m}}{N_{SREG}^{SCCE}} \right\rfloor} \right\rfloor \cdot \left( N_{RB}^{X_m} + N_{RB}^{X_m} \bmod N_{SREG}^{SCCE} \right) + j,$$

where $N_{SREG}^{SCCE}$ is a number of REGS per CCE, $j \in \{0, \ldots, N_{SREG}^{SCCE} -\}$, $$n \in \left\{ 0, \ldots, Ns * \left\lfloor \frac{N_{RB}^{X_m}}{N_{SREG}^{SCCE}} \right\rfloor - 1 \right\},$$

n is a CCE index, Ns is a number of symbols in the resource set, and $N_{RB}^{X_m}$ is a number of REGs in each symbol of the resource set.

29. An apparatus for wireless communications, comprising:
a processor;
memory in electronic communication with the processor; and
instructions stored in the memory and executable by the processor to cause the apparatus to:
identify a resource set for transmission of a set of control channel elements (CCEs) to at least one user equipment (UE), wherein the resource set comprises multiple resource element groups (REGs) associated with respective CCEs and multiple symbols wherein a REG of the multiple REGs spans, in the time domain, a respective single symbol of the multiple symbols;

determine a mapping scheme for mapping REGs of the resource set to CCEs of the set of CCEs based at least in part on a number of REGs in a respective symbol of the multiple symbols of the resource set and whether the number of REGs in the respective symbol is an odd number, wherein the number of REGs in the respective symbol is greater than a number of REGs in a CCE within the respective symbol of the set of CCEs;

map REGs to each CCE of the set of CCEs based at least in part on the mapping scheme; and transmit the mapped REGs to the at least one UE.

30. An apparatus for wireless communications, comprising:

a processor;

memory in electronic communication with the processor; and instructions stored in the memory and executable by the processor to cause the apparatus to:

receive, from a network device, a resource set configuration that identifies a resource set for one or more control channel elements (CCEs), wherein the resource set comprises multiple resource element groups (REGs) associated with respective CCEs and multiple symbols, wherein a REG of the multiple REGs spans, in the time domain, a respective single symbol of the multiple symbols;

determine a mapping scheme for mapping REGs of the resource set to the one or more CCEs based at least in part on the resource set configuration and a number of REGs in a respective symbol of the multiple symbols of the resource set, including whether the number of REGs in the respective symbol of the multiple symbols of the resource set is an odd number, wherein the number of REGs in the respective symbol is greater than a number of REGs in a CCE within the respective symbol of the one or more CCEs;

monitor the resource set for at least one of the one or more CCEs based at least in part on the mapping scheme; and decode the at least one CCE based at least in part on the monitoring.

* * * * *